(12) United States Patent
Wilt

(10) Patent No.: US 8,005,885 B1
(45) Date of Patent: Aug. 23, 2011

(54) ENCODED ROUNDING CONTROL TO EMULATE DIRECTED ROUNDING DURING ARITHMETIC OPERATIONS

(75) Inventor: Nicholas Patrick Wilt, Rochester, NY (US)

(73) Assignee: Nvidia Corporation, Santa Clara, CA (US)

( * ) Notice: Subject to any disclaimer, the term of this patent is extended or adjusted under 35 U.S.C. 154(b) by 1116 days.

(21) Appl. No.: 11/251,489

(22) Filed: Oct. 14, 2005

(51) Int. Cl.
*G06F 7/38* (2006.01)
(52) U.S. Cl. .................. 708/551; 708/550; 708/497
(58) Field of Classification Search .............. 708/490, 708/495–499
See application file for complete search history.

(56) References Cited

U.S. PATENT DOCUMENTS

| | | | | |
|---|---|---|---|---|
| 5,450,607 A * | 9/1995 | Kowalczyk et al. | 712/41 |
| 5,680,339 A * | 10/1997 | Moyse et al. | 708/493 |
| 5,812,439 A * | 9/1998 | Hansen | 708/497 |
| 6,035,120 A * | 3/2000 | Ravichandran | 717/141 |
| 6,044,392 A * | 3/2000 | Anderson et al. | 708/551 |
| 6,058,410 A * | 5/2000 | Sharangpani | 708/551 |
| 6,173,394 B1 * | 1/2001 | Guttag et al. | 712/226 |
| 6,233,672 B1 * | 5/2001 | Lynch | 712/222 |
| 7,069,288 B2 * | 6/2006 | Steele, Jr. | 708/495 |
| 7,162,621 B2 * | 1/2007 | Kissell | 712/242 |
| 7,219,117 B2 * | 5/2007 | Steele, Jr. | 708/495 |
| 7,236,999 B2 * | 6/2007 | Steele, Jr. | 708/495 |
| 7,395,297 B2 * | 7/2008 | Steele, Jr. | 708/525 |
| 7,529,912 B2 * | 5/2009 | Henry et al. | 712/210 |
| 2002/0002573 A1 * | 1/2002 | Landers et al. | 708/501 |
| 2008/0012599 A1 * | 1/2008 | Hayes | 326/38 |

OTHER PUBLICATIONS

James E. Stine, Michael J. Schulte, "A Combined Interval and Floating Point Multiplier," glsvlsi, pp. 208, Great Lakes Symposium on VLSI '98, 1998.*
Burgess, N., "Prenormalization Rounding in IEEE Floating-Point Operations Using a Flagged Prefix Adder," IEEE Transactions on Very Large Scale Integration (VLSI) Systems, vol. 13, No. 2, pp. 266-277, Feb. 2005.*
Alpha Architecture Handbook, Order No. EC-QD2KB-TE, *Digital Equipment Corporation*, Maynard, Massachusetts, Oct. 1996, Chapter 4 (pp. 4-74 to 4-156).
H. Ratschek, et al., "Geometry Computations with Interval and New Robust Methods-Applications in Computer Graphics, GIS and Computational Geometry," *Harwood Publishing Limited*, © Helmut Ratschek and John Rokne 2003, pp. 19-25.
IA-32 Intel® Architecture Optimization Reference Manual, Order No. 248966-012, Jun. 2005, Chapter 2 (pp. 2-62 to 2-98).
IA-32 Intel® Architecture Software Developer's Manual, Basic Architecture, Order No. 253665-017, Sep. 2005, vol. 1, Chapter 8.1.5 (pp. 8-10 to 8-11).

* cited by examiner

*Primary Examiner* — Lewis A Bullock, Jr.
*Assistant Examiner* — Matthew Sandifer
(74) *Attorney, Agent, or Firm* — Cooley LLP

(57) ABSTRACT

A processor, an instruction set architecture, an instruction, a computer readable medium and a method for implementing optimal per-instruction encoding of rounding control to emulate directed rounding are disclosed. In one embodiment, an apparatus designed to perform directed rounding includes an instruction decoder configured to decode an instruction, which includes a rounding control information to calculate a result boundary. The apparatus also includes a directed rounding emulator configured to adjust the result boundary to form an adjusted result boundary as a function of the rounding control bit. The adjusted result boundary establishes an endpoint for an interval that includes a result. In one embodiment, the directed round emulator is further configured to emulate a round-to-negative infinity rounding mode and a round-to-positive infinity rounding mode based on at least the single rounding control bit.

11 Claims, 16 Drawing Sheets

```
Zl, Zu = Xl, Xu * Yl, Yu mult.rtn    temp t0, Xl, Yl       //** temp t0 ——— Xl * Yl, with rounding down to -INF  ⎫
mult.rtn    temp t1, Xl, Yu       //** temp t1 ——— Xl * Yu, with rounding down to -INF  ⎬ 30
mult.rtn    temp t2, Xu, Yl       //** temp t2 ——— Xu * Yl, with rounding down to -INF  ⎪
mult.rtn    temp t3, Xu, Yu       //** temp t3 ——— Xu * Yu, with rounding down to -INF  ⎭ mult.rtp    temp t4, Xl, Yl       //** temp t4 ——— Xl * Yl, with rounding up to +INF    ⎫
mult.rtp    temp t5, Xl, Yu       //** temp t5 ——— Xl * Yu, with rounding up to +INF    ⎬ 40
mult.rtp    temp t6, Xu, Yl       //** temp t6 ——— Xu * Yl, with rounding up to +INF    ⎪
mult.rtp    temp t7, Xu, Yu       //** temp t7 ——— Xu * Yu, with rounding up to +INF    ⎭ fmin        L, temp t0, temp t1   //** L ——— min (temp t0 or temp t1)                   ⎫
fmin        L, L, temp t2         //** L ——— min (L or temp t2)                         ⎬ 50
fmin        L, L, temp t3         //** L ——— min (L or temp t3); fmin is Minimum L      ⎭ fmax        U, temp t4, temp t5   //** U ——— max(temp t4 or temp t5)                    ⎫
fmax        U, U, temp t6         //** U ——— max(U or temp t6)                          ⎬ 60
fmax        U, U, temp t7         //** U ——— max(U or temp t7); fmax is Maximum U       ⎭
```

| | | |
|---|---|---|
| fmul.trunc | temp t0, Xl, Yl | // temp t0 = Xl*Yl with truncation |
| fmul.trunc | temp t1, Xl, Yu | |
| fmul.trunc | temp t2, Xu, Yl | |
| fmul.trunc | temp t3, Xu, Yu | |

} 1020

| | | |
|---|---|---|
| DRA.rtp | temp t4, temp t0 | // temp t4 = temp t0 adjusted toward |
| | | //         positive infinity |
| DRA.rtp | temp t5, temp t1 | // temp t5..t7 get upper bounds |
| DRA.rtp | temp t6, temp t2 | |
| DRA.rtp | temp t7, temp t3 | |

} 1080

| | | |
|---|---|---|
| DRA.rtn | temp t0, temp t0 | // temp t0 = temp t0 adjusted toward |
| | | //         negative infinity |
| DRA.rtn | temp t1, temp t1 | // temp t5..t7 get upper bounds |
| DRA.rtn | temp t2, temp t2 | // |
| DRA.rtn | temp t3, temp t3 | // |

} 1070

| | |
|---|---|
| fmin | L, temp t0, temp t1 |
| fmin | L, L, temp t2 |
| fmin | L, L, temp t3 |

} 1050

| | |
|---|---|
| fmax | U, temp t4, temp t5 |
| fmax | U, U, temp t6 |
| fmax | U, U, temp t7 |

| | | |
|---|---|---|
| fmul.trunc | CC0, temp t0,Xl,Yl | // temp t0 = Xl*Yl with truncation and put exact/inexact in CC0 |
| fmul.trunc | CC1, temp t1,Xl,Yu | |
| fmul.trunc | CC2, temp t2,Xu,Yl | |
| fmul.trunc | CC3, temp t3,Xu,Yu | |

} 1020

| | | |
|---|---|---|
| DRA.rtp | temp t4, temp t0, CC0 | // temp t4 = temp t0 adjusted toward positive infinity; do not adjust if CC0 shows exact. |
| DRA.rtp | temp t5, temp t1, CC1 | // temp t5..t7 get upper bounds |
| DRA.rtp | temp t6, temp t2, CC2 | |
| DRA.rtp | temp t7, temp t3, CC3 | |

} 1080

| | | |
|---|---|---|
| DRA.rtn | temp t0, temp t0, CC0 | // temp t0 = temp t0 adjusted toward negative infinity; do not adjust if CC0 shows exact. |
| DRA.rtn | temp t1, temp t1, CC1 | // temp t5..t7 get upper bounds |
| DRA.rtn | temp t2, temp t2, CC2 | // |
| DRA.rtn | temp t3, temp t3, CC3 | // |

} 1070

| | |
|---|---|
| fmin | L, temp t0, temp t1 |
| fmin | L, L, temp t2 |
| fmin | L, L, temp t3 |

} 1050

| | |
|---|---|
| fmax | U, temp t4, temp t5 |
| fmax | U, U, temp t6 |
| fmax | U, U, temp t7 |

ENCODED ROUNDING CONTROL TO EMULATE DIRECTED ROUNDING DURING ARITHMETIC OPERATIONS

BRIEF DESCRIPTION OF THE INVENTION

This invention relates generally to computing devices and computer-implemented operations, and more particularly, to an instruction set architecture configured to encode rounding control information on a per-instruction basis for at least a subset of its instruction set. In some embodiments, an instruction encoded with rounding control information to emulate directed rounding for performing, for example, interval arithmetic operations.

BACKGROUND OF THE INVENTION

Processor architectures and their arithmetic units, such as floating-point units, have generally evolved with a natural tension between whether to increase performance by implementing specialized instructions or whether to minimize the complexity of the underlying structures that otherwise would become too unwieldy to realize the benefits from implementing those specialized instructions. As such, processors are designed to implement instruction set architectures ("ISAs") having a set of instructions that strikes an optimal balance between the above-described natural tensions. For example, some common processor architectures contain a global register to maintain rounding control information for rounding computational results rather than incorporating such information into its instructions. In usage, a floating-point unit typically stores rounding control information in the global register to perform various arithmetic operations, such as adding, subtracting and multiplying, as well as complex transcendental functions (e.g., sine and cosine functions). But note that the global register holds the rounding control information as global state information. As such, the rounding control information remains resident during execution of a number of instructions so that only one rounding mode applies.

A drawback to this approach is that when the flow control of executing instructions requires frequent changes between one rounding mode and another, the processor needs to update one or more rounding control bits in the global register (e.g., a control status word) during each change in flow control. Typically, this can delay processing by 40 clock cycles or more. Such performance penalties are commonplace during frequent calls to and returns from interrupts (e.g., from servicing subroutines or other executable functions, such as dynamic link library modules, or "DLLs"). Another drawback to this approach is that the processor architecture usually manages two rounding mode control ("RMC") bits in the global register, thereby requiring the rounding control information to specify four rounding modes. For example, two RMC bits of "00" can specify a round-to-nearest rounding mode, two RMC bits of "01" can specify a round-to-negative infinity rounding mode, two RMC bits of "10" can specify a round-to-positive infinity rounding mode, and two RMC bits of "11" can specify a round-to-zero rounding mode. Yet another drawback is that the use of such global registers can lead to variability in the results during the execution one or more code portions (e.g., subroutines) in computer programs. In particular, each code portion can yield a different result for varying states (or settings) of the global register. So if different code portions are combined to form a computer program, and each depends on a specific state of the global register, then subsequently executed code portions generally will not interoperate properly with global register settings for previously executed code portions. This leads to variability in results. Consequently, it becomes necessary to either place the global register in a specific state for each code portion or know during code development the previous global register states, both of which adds inefficiencies to code development and execution.

A prime motivation to include the four rounding modes is that the Institute of Electrical and Electronics Engineers Standard for Binary Floating-Point Arithmetic ("IEEE Std 754-1985") requires a processor to provide these four rounding modes for compliance to facilitate software portability onto differing hardware platforms. Round-to-negative infinity and round-to-positive infinity rounding modes are particularly important for traditional processors when performing interval arithmetic, which is used to estimate a possible range of values (i.e., an interval of real numbers) that a computation will produce, given the range of values of each of the input numbers that are to be arithmetically operated upon. Generally during interval computations, a conventional processor that is computing a lower bound rounds an interval endpoint toward negative infinity ("−INF"), while during an upper bound computation, it rounds the other interval endpoint toward positive infinity ("+INF"). Traditional processors use two rounding control bits to comply with IEEE 754-1985.

Lesser-known processor architectures encode two rounding mode control bits into instructions of its instruction set to provide conventional per-instruction rounding mode control. These two rounding control bits are usually located in a reserved portion of in an instruction (e.g., in a function field). One drawback to this scheme is that a control register, such as the above-described global register, is required to implement rounding to +INF for compliance with IEEE 754. This adds additional overhead than otherwise is needed if this approach operated independent of a value in the control register. Another drawback is that it encodes rounding to only one direction of infinity in the instruction, while relying on the control register to provide rounding to the other direction of infinity. As such, this approach adds at least two rounding mode control bits to the width of instruction word size (e.g., by increasing the size of the function field), without the benefit of being reliant on the control register. Further, the encoded rounding mode control bits reduce the number of bits available for performing other necessary functions.

FIG. 1 is a code snippet representing a conventional implementation of directed rounding with floating point operations. Code snippet 20 illustrates conventional techniques for implementing directed rounding as applied to interval arithmetic, and specifically, interval multiplication of two intervals. Namely, code snippet 20 multiplies intervals X=[Xl, Xu] and Y=[Yl, Yu] to form a product 10 as interval [Zl, Zu]. Traditionally, instructions similar to "mult.rtn" 30 are executed to multiply left and right endpoints of both intervals X and Y by first rounding down to −INF. In particular, the left endpoint of X ("Xl") is multiplied with the left endpoint of Y ("Yl") and endpoint Xl is multiplied by the right endpoint of Y ("Yu"). Code snippet 20 also multiplies endpoints Xu with Yl and endpoints Xu with Yu. This forms four intermediate products all of which are rounded down to −INF. Instructions like "mult.rtp" 40 perform similar multiplicative operations except these instructions round the intermediate products up to +INF. Finally, instructions "fmin" 50 and "fmax" 60 determine the minimum and maximum values, respectively, thereby producing the left endpoint (e.g., Zl) and the right endpoint (e.g., Zu) of the result. ".rtn" and ".rtp" denote "round to negative infinity" and "round to positive infinity," respectively. Note that a drawback of implementing code snippet 20 to accomplish directed rounding for interval multiplication is that instructions 30 and 40 together include eight multiplication operations, each of which are relatively computation-intensive, thereby consuming computational resources that otherwise can be freed-up to perform other calculations.

In view of the foregoing, it would be desirable to provide a processor, an instruction set architecture, an instruction, a computer readable medium and a method that minimizes the above-mentioned drawbacks and provides for optimal per-instruction encoding of rounding control to facilitate emulation of directed rounding to a negative or a positive infinity.

SUMMARY OF THE INVENTION

Disclosed are a processor, an instruction set architecture, an instruction, a computer readable medium and a method for optimally encoding rounding control on a per-instruction basis to emulate directed rounding to a negative or a positive infinity. In one embodiment, an apparatus designed to perform rounding for floating point operations includes an instruction decoder configured to decode an instruction, which includes rounding control information to calculate a result boundary. The apparatus also includes a directed rounding emulator configured to adjust the result boundary toward either a first value or a second value to form an adjusted result boundary as a function of the rounding control information. The adjusted result boundary establishes an endpoint for an interval that includes a result. In one embodiment, the directed round emulator is further configured to emulate a round-to-negative infinity rounding mode and a round-to-positive infinity rounding mode based on rounding control information. In at least one embodiment, the rounding control information is a single rounding control bit specifying either a round-to-nearest rounding mode or a round-to-zero rounding mode. Generally, the directed rounding emulator is configured to use no more than one rounding control bit to comply with at least the Institute of Electrical and Electronics Engineers Standard for Binary Floating-Point Arithmetic ("IEEE Std 754-1985"). In some cases, the apparatus further includes an instruction bus configured to associate only a single rounding control bit per instruction, thereby reducing the width of either the instruction or the instruction bus, or both, to conserve resources that otherwise would be consumed to carry two or more rounding control bits per instruction. In various embodiments, the directed rounding emulator is further configured to determine the result boundary as either a lower bound or an upper bound. As such, the apparatus can include a result boundary operation unit configured to calculate the result boundary using an arithmetic operation similar to that used to generate the result. The apparatus also contains a truncator configured to truncate a value representing the result boundary. Note that in some cases, the result boundary operation unit and the truncator operate in response to the execution of a single instruction, the truncator being responsive to a single rounding control bit specifying a round-to-zero mode. In a specific embodiment, the apparatus further includes a sign determinator unit configured to determine a sign value that represents the sign of the value representing the result boundary, and a result boundary adjuster configured to adjust the result boundary toward the first value if the sign value matches the sign of the first value or toward the second value if the sign value matches the sign of the second value, wherein the truncator adjusts the result boundary toward the first value if the sign value does not match the sign of the first value or toward the second value if the value does not match the sign of the second value.

In another embodiment of the invention, a processor is configured to perform directed rounding and includes an instruction decoder configured to decode an instruction including one rounding control bit to calculate a result boundary. The processor also includes a floating-point unit having a result function block configured to perform arithmetic operations on one or more floating-point numbers, and a result boundary block configured to perform, for example, interval arithmetic operations for each of the one or more floating-point numbers to calculate a lower result boundary value and an upper result boundary value. The result boundary block being configured to emulate directed rounding to negative infinity ("−INF") and positive infinity ("+INF") based on the one rounding control bit and the sign of either the lower result boundary value or the upper result boundary value. Advantageously, the one rounding control bit being encoded with the instruction avoids implementing a register, such as a global register, for controlling rounding modes, thereby preserving computational resources that are otherwise used to access the register for each different rounding mode being implemented. In one embodiment, the processor can also include a unified register file configured to calculate the lower result and the upper result boundary values, thereby conserving computational resources and/or time that otherwise would be consumed by exchanging the lower result and the upper result boundary values between separate integer and floating-point register files. In some cases, the result boundary block further includes a result boundary adjuster configured to selectably adjust the lower result and the upper result boundary values to emulate directed rounding by adding an amount to a mantissa for floating-point representations of the lower result and the upper result boundary values. In a specific embodiment, the processor further includes a special number handler configured to screen out any lower result boundary value or any upper result boundary value that is not a number ("NaN") or is an infinite number ("INF"). The processor also has an exact determinator configured to determine the exactness of the lower result boundary value and the upper result boundary value, wherein the result boundary block is configured to implement direct rounding emulation if each of the lower and the upper result boundary values is an inexact floating-point number. In a specific embodiment, the processor is configured to execute a single instruction "Directed-Round-Adjust (Z)" takes a result boundary Z as an operand and returns either a truncated result boundary or an adjusted result boundary. In one embodiment, the single instruction Directed-Round-Adjust (Z) also resolves special numbers, such as infinite numbers ("INFs") and Not a Number ("NANs"), and optionally determines the exactness of the result boundary.

In yet another embodiment, a computer readable medium includes executable instructions to perform directed rounding to implement, for example, interval arithmetic. The computer readable medium includes one or more executable instructions to invoke an arithmetic operation that generates result boundaries defining an interval that includes a result, the result boundaries being expressed as floating-point numbers. Further, the computer readable medium also includes executable instructions to truncate the result boundaries to round to zero to form truncated result boundaries, and to calculate adjusted result boundaries for a subset of the result boundaries to round away from zero. In an embodiment, the executable instruction to invoke the arithmetic operation is encoded with a single rounding control bit that enables the executable instruction to truncate the result boundaries. In one embodiment, the one or more executable instructions to invoke the arithmetic operation and to truncate the result boundaries constitute either a single assembly instruction, a single machine-level instruction, or a single high-level instruction.

BRIEF DESCRIPTION OF THE FIGURES

The invention is more fully appreciated in connection with the following detailed description taken in conjunction with the accompanying drawings, in which:

FIG. 1 shows a code snippet representing a conventional implementation of directed rounding with floating point operations;

FIGS. 10A to 10C depict a code snippets each representing an implementation of specialized instructions to provide for directed rounding emulation, according to at least some embodiment of the invention;

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 2A:
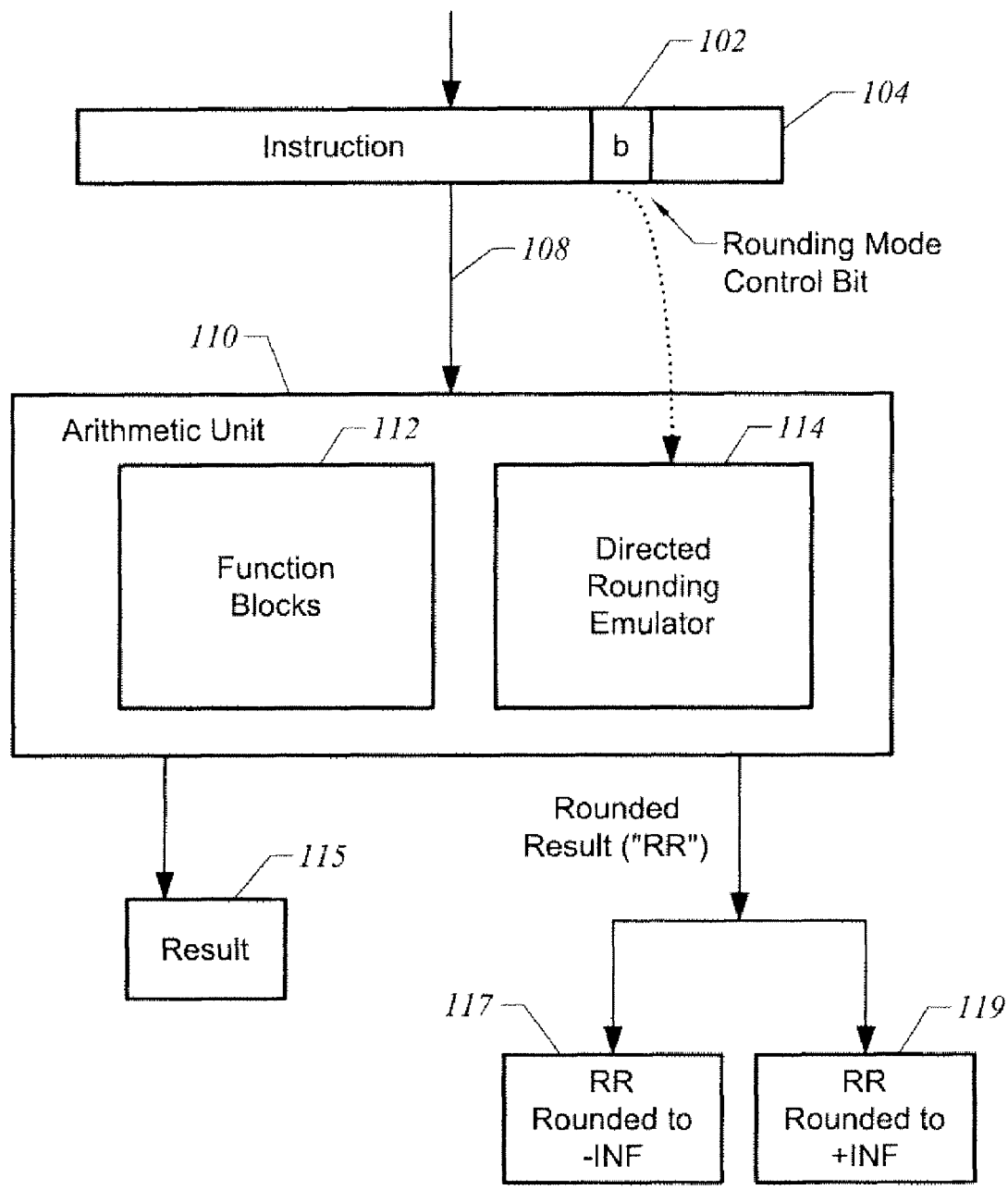
FIG. 2A is a block diagram of an arithmetic unit that emulates directed rounding during arithmetic operations, according to at least one specific embodiment of the invention.

FIG. 2A is a block diagram of an arithmetic unit that emulates directed rounding during arithmetic operations, according to at least one specific embodiment of the invention. Arithmetic unit 110 includes function blocks 112 for executing arithmetic and logic operations as well as a directed rounding emulator 114 for emulating directed round modes in response to instructions specifying rounding control modes. Arithmetic unit 110 relies on directed rounding emulator 114 to emulate at least some rounding mode operations to reduce numerical errors in floating-point computations that otherwise can lead to inaccurate results. Examples of such rounding mode operations include a round-to-nearest rounding mode, a round-to-negative infinity rounding mode ("–INF"), a round-to-positive infinity rounding mode ("+INF") and a round-to-zero rounding mode.

As used herein, the term "direct rounding" refers in some embodiments to one or more operations for rounding a result inwardly (i.e., toward zero) or outwardly (i.e., away from zero) to either positive or negative infinity. Generally, at least one of the operations includes truncation of, for example, a result. Also used herein, the term "emulated rounding mode" refers in some embodiments to a rounding mode that mimics or at least provides similar rounding results as an expressly specified rounding mode. But the emulated rounding modes of the various embodiments need not be invoked by dedicated rounding control mode information, such as one or more bits specifying round-to-negative infinity or round-to-positive infinity. As such, directed rounding emulator 114 is configured to emulate rounding modes to achieve the same results as conventional rounding modes, but requires less explicit rounding control information to do so. For example, directed rounding emulator 114 can emulate directed rounding to effectuate a round-to-negative infinity rounding mode and a round-to-positive infinity rounding mode. These modes are emulated rounding modes that use a single rounding control bit that otherwise only expressly specifies either a round-to-nearest rounding mode or a round-to-zero rounding mode. Therefore, instruction 104 can encode the invocation of two emulated rounding modes into a single rounding control bit.

Advantageously, the use of the single rounding control bit reduces the amount of control information necessary to implement at least these four rounding modes. This means that arithmetic unit 110 can facilitate the design of an instruction set architecture that includes reduced instruction sizes for at least a subset of instructions, thereby reducing the bit width of either the instruction sizes or instruction bus 108, or both. Encoding rounding control information into instructions advantageously helps curtail frequent changes in flow control of executing instruction due to loading rounding mode changes into a register (e.g., a global register), thereby conserving computational resources and as well as time. Directed rounding emulator 114 can also advantageously enable arithmetic unit 110 to comply with at least the Institute of Electrical and Electronics Engineers Standard for Binary Floating-Point Arithmetic ("IEEE Std 754-1985"), or equivalent standards, while implementing no more than one rounding control bit in some embodiments. In particular, directed rounding emulator 114 can comply with standards without including explicit rounding control information in instruction 104 that specifies rounding to –INF and +INF. Again, by specifying only round-to-nearest and round-to-zero rounding modes in instruction 104, the amount of rounding control information is reduced.

Directed rounding emulator 114 initiates emulated rounding modes based, at least in part, on the context of the functions that arithmetic unit 110 is executing. The execution of specific functions by arithmetic unit 110 can provide a context with which to determine rounding mode emulation. For example, if arithmetic unit 110 is performing interval arithmetic, then the context of determining a lower bound can invoke an emulated round-to-negative infinity operation, whereas the context of determining an upper bound can invoke an emulated round-to-positive infinity operation. Consequently, arithmetic unit 110 in this example does not require a rounding control bit to specify which of those two round-to-infinity rounding modes to implement. So by determining the context in which arithmetic unit 110 is operating, directed rounding emulator 114 can alleviate the burden of implementing additional rounding control information in either instruction 104 or a global register (not shown). In various embodiments, arithmetic unit 110 needs only a single rounding control bit ("b") 102 to enable rounding mode emulation according to specific embodiments of the invention. As such, a specific state of a single rounding control bit can encode the invocation of an emulated rounding mode, with the context determining which rounding mode to emulate.

Figure 2B:
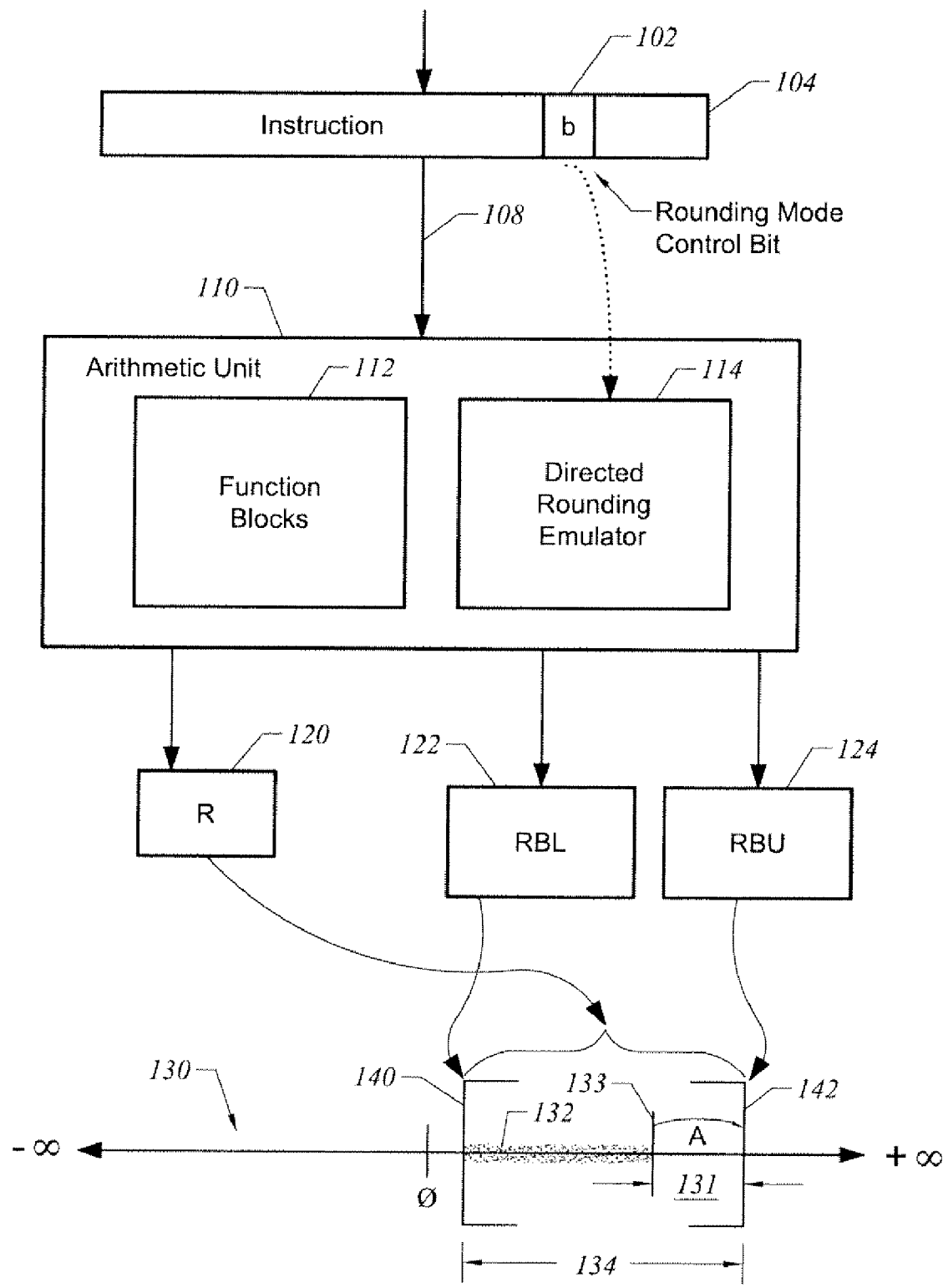
FIG. 2B is a block diagram of arithmetic unit 110 of FIG. 2A that emulates directed rounding to implement interval arithmetic operations, according to at least one specific embodiment of the invention.

In a specific embodiment, function blocks 112 generate a result 115 as an output of a floating-point operation, and directed rounding emulator 114 emulates one or more rounding modes to round result 115 to form a rounded result ("RR"). Consider that if directed rounding emulator 114 is emulating "round-to-positive infinity," then it forms a rounded result 119 (rounded to +INF), whereas it forms a rounded result 117 (rounded to -INF) if it is emulating "round-to-negative infinity." In particular, directed rounding emulator 114 selectably adjusts an intermediate rounded result for result 115 toward either a first number (e.g., -INF) or a second number (e.g., +INF), depending on the context, to form an adjusted result as either rounded result 117 or 119. As shown in FIG. 2B, directed rounding emulator 114 can perform emulated "round-to-positive infinity" and "round-to-negative infinity" operations to form rounded results 117 and 119 as a lower bound and an upper bound, respectively, for the same result 115.

FIG. 2B is a block diagram arithmetic unit 110 of FIG. 2A that emulates directed rounding to implement interval arithmetic operations, according to at least one specific embodiment of the invention. In the example shown, directed rounding emulator 114 emulates one or more rounding modes by adjusting a result boundary toward either a first number (e.g., -INF) or a second number (e.g., +INF), depending on the context, to form an adjusted result boundary. The adjusted result boundary establishes an endpoint (i.e., a lower or upper bound) for an interval that specifies a set of all real numbers that includes a result ("R") 120, which function blocks 112 computes. As used herein, the term "result boundary" can refer in some embodiments to either a lower bound or an upper bound of a computed interval.

To illustrate the functionality of directed rounding emulator 114 during interval arithmetic, first consider that function blocks 112 provide the following execution units: an addition function ("FADD"), a subtraction function ("FSUB"), a multiplication function ("FMUL"), a division function ("FDIV"), a square root function ("FSQRT"), a comparison function, ("FCMP") as well as any other known function, including transcendental functions. Each of function blocks 112 is responsive to a particular program instruction 104 designed to invoke a specific function. Typically, program instruction 104 contains one or more operands on which a function is to be performed, with subsequent execution of program instruction 104 yielding a result 120. The operands can be expressed in fixed-point number format (i.e., as integer numbers) or in floating-point number format.

Arithmetic unit 110 is configured to perform interval arithmetic on the operands used to compute result 120. Namely, arithmetic unit 110 is configured to compute a lower result boundary ("RBL") 122 and an upper result boundary ("RBU") 124 using a similar function used to compute result 120. For example, if a multiplication function of function blocks 112 operates upon operands X and Y, then an interval that contains operand X (i.e., interval [X(lower), X(upper)]) is multiplied with an interval that contains operand Y (i.e., interval [Y(lower), Y(upper)]). According to the principles of interval arithmetic, lower result boundary 122 and upper result boundary 124 define an interval in which result 120 is most likely to lie. To illustrate, FIG. 2B depicts arithmetic unit 110 determining an interval 134 for result 120 on a number line 130 that contains all real number from -INF to +INF. Here, FIG. 2B represents lower result boundary 122 and upper result boundary 124 as a left bracket 140 and a right bracket 142, respectively. To emulate directed rounding to, for example, positive infinity, directed rounding emulator 114 adjusts an initial upper result boundary 133 by an amount ("A") 131 to a number coinciding right bracket 142. This extends an originally-computed interval 132 to interval 134. In at least one embodiment, the operation used to calculate either lower result boundary 122 or upper result boundary 124 provides, in whole or in part, the context in which to determine whether to emulate rounding to negative infinity or positive infinity. Note while FIG. 2B illustrates the application of directed rounding emulation for interval arithmetic, various embodiments of the invention have application to other types of mathematical computations other than interval arithmetic.

Figure 2C:
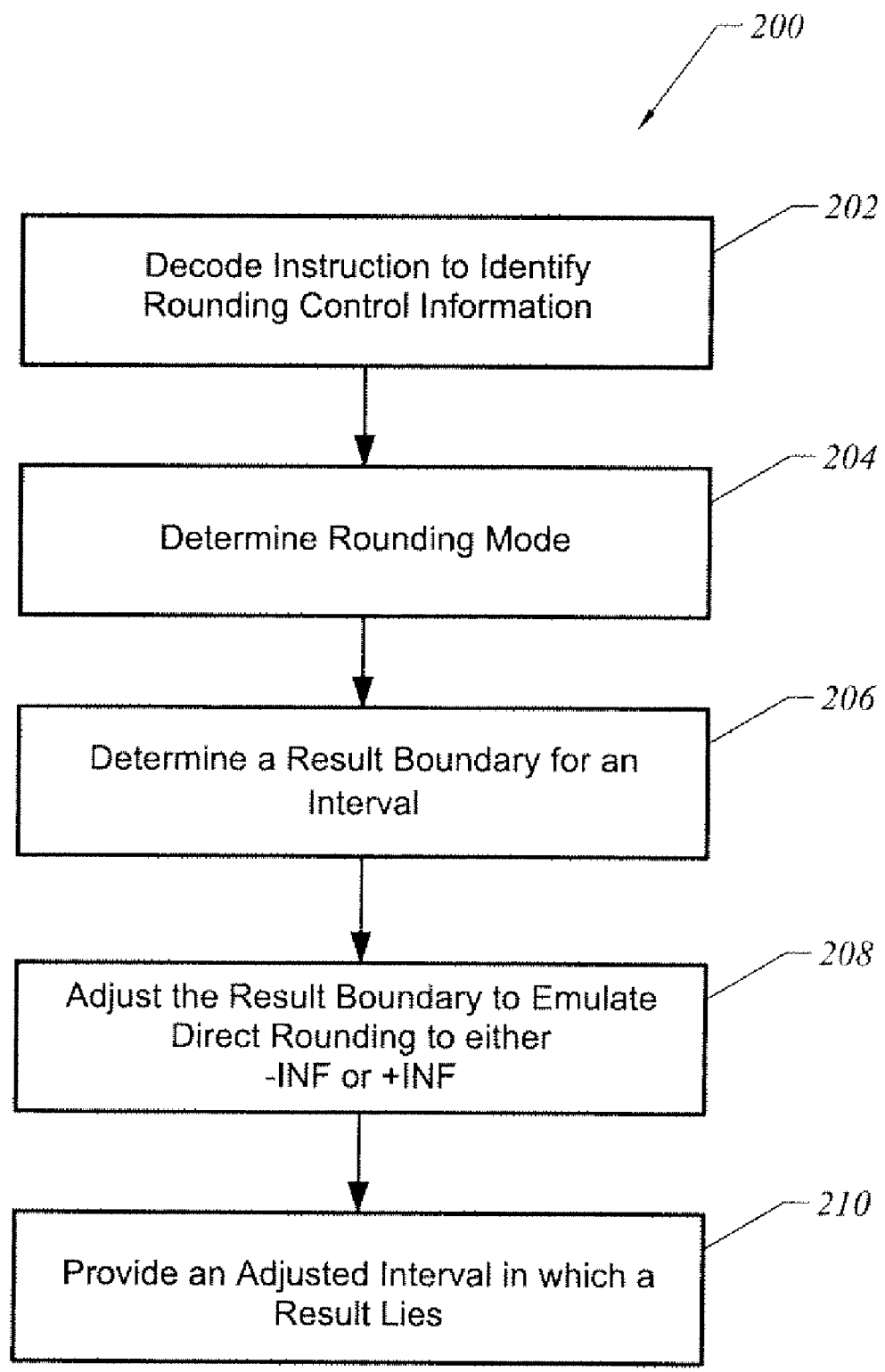
FIG. 2C is a flow diagram depicting one example of a method for emulating rounding modes in accordance with the invention.

FIG. 2C is a flow diagram 200 depicting one example of a method for emulating rounding modes in accordance with the invention. At 202, an instruction is decoded to extract rounding control information. In some cases, a directed round emulator takes the extracted rounding control information directly from a rounding control bit in a function field. In other cases, it takes the extracted rounding control information indirectly from an operation code (or "op-code") being distilled into micro-operations ("micro-ops"). Micro-ops are RISC-like primitive instructions that are smaller than the instruction from which it was decoded, but are directly executable by execution units of an arithmetic unit. For example, consider a single macro-instruction for performing addition, whereby "add [mem],reg" performs an addition operation on the contents in a memory location, "mem," with a register, "reg." As an intermediate step, this instruction moves the contents to a second register, "reg2," which is a temporary register. This instruction can be broken down into the following micro-ops: move mem to reg2 (i.e., move contents to the second register), add reg to reg2 (add value in one register to the value in the second register; leave addition result in second register), and move reg2 to mem (i.e., store addition result back in memory location).

From the decoded instruction, the flow in FIG. 2C determines a rounding mode at 204 from the identified rounding control information. For example, a rounding control bit in a first state (e.g., 0) specifies implementation of a round-to-nearest rounding mode, whereas a second state (e.g., 1) specifies a round-to-zero rounding mode. Further to this example, consider the rounding control bit is in the second state, thereby enabling round mode emulation. At 206, the flow determines a result boundary for an interval. In particular, the flow at 206 identifies which boundary is to be computed for an interval (i.e., either the lower result boundary or an upper result boundary, or both). This is followed by a computation that yields one or more identified result boundaries. Next at 208, the flow adjusts a computed result boundary to emulate direct rounding to either -INF or +INF depending on the context (i.e. depending on whether a lower boundary or an upper boundary is being determined). At 210, the flow provides the adjusted interval in which the result lies to an arithmetic unit and/or a processor to reduce computational errors, for example, during rendering of 3-D computer images.

Figure 3:
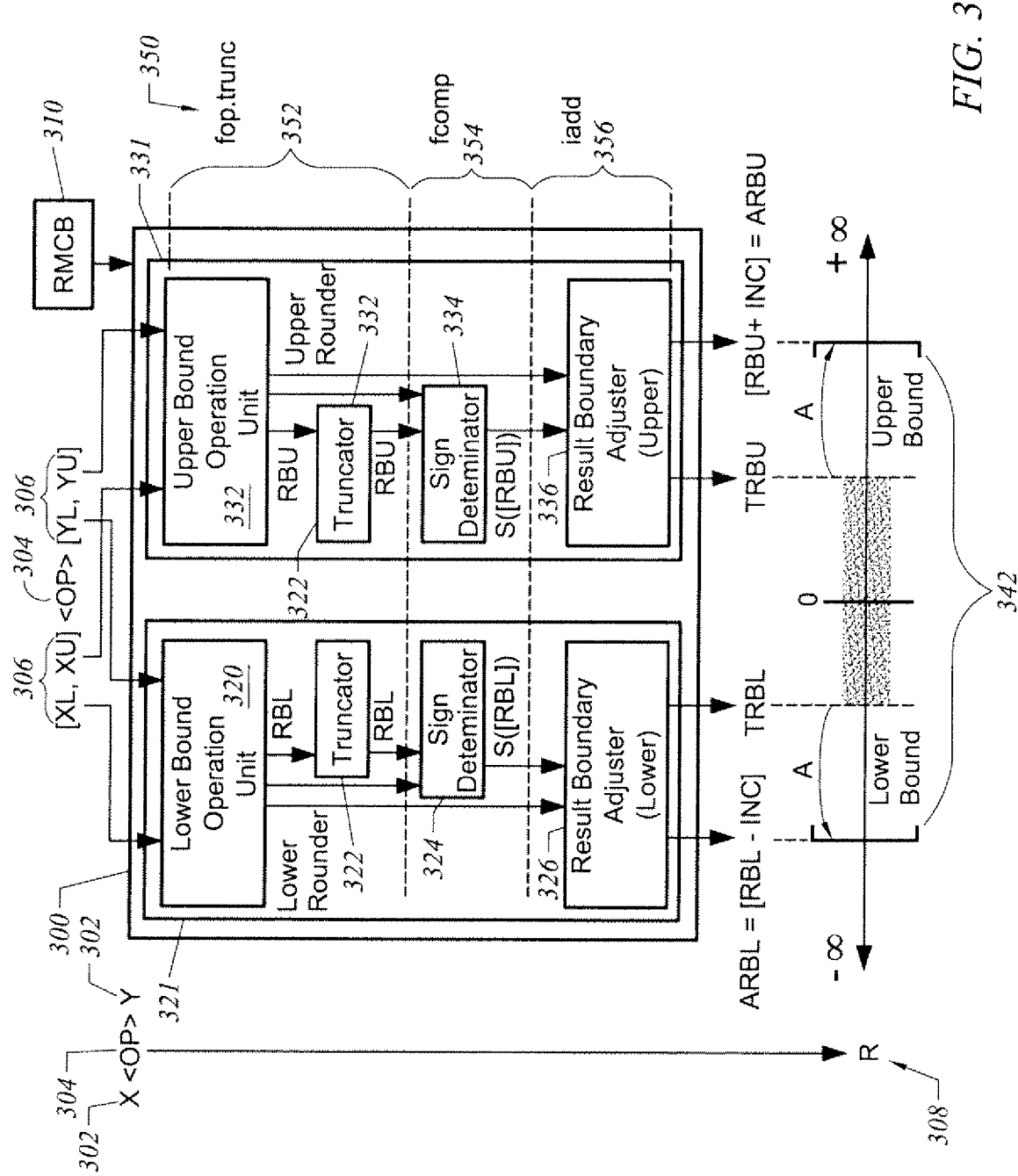
FIG. 3 is a block diagram illustrating an exemplary structure for a directed rounding emulator in accordance with one embodiment of the invention.

FIG. 3 is a block diagram illustrating an exemplary structure for a directed rounding emulator in accordance with one embodiment of the invention. As shown, directed rounding emulator 300 is configured to perform an arithmetic operation ("<OP>") 304 on each interval [X(lower), X(upper)] and [Y(lower), Y(upper)] as interval operands 306 to generate lower and upper result boundaries "RBL" and "RBU" as well as lower and upper adjusted result boundaries "ARBL" and "ARBU." Directed rounding emulator 300 includes a lower rounder 321 and an upper rounder 331 to respectively emulate round-to-negative infinity and round-to-positive infinity rounding operations. Note that the operation of directed rounding emulator 300 is shown in association with an arithmetic unit (not shown) performing an arithmetic operation ("<OP>") 304 on X and Y as operands 302 to generate a primary result ("R") 308. Arithmetic operation ("<OP>") 304 can represent any arithmetic operation, such as addition, subtraction, multiplication, division, square root, etc. When the arithmetic unit performs interval arithmetic, result 308 can be computed along with or in series with the computation of its interval by directed rounding emulator 300. As used herein, the term "primary result" in some embodiments refers to the output of a function block.

In operation, directed rounding emulator 300 passes lower boundaries XL and YL and upper boundaries XU and YU to lower boundary operation unit 320 and upper boundary operation unit 330, respectively, for performing interval arithmetic operations to generate an initial lower result boundary ("RBL") and an initial upper result boundary ("RBU"). Boundaries RBL and RBU are determines so that primary result 308 lies between the two. In alternative embodiments, a processor or function block of an arithmetic unit can generate these initial result boundaries externally, thereby omitting lower boundary operation unit 320 and upper boundary operation unit 330 from directed rounding emulator 300. Further to the operation of lower rounder 321, truncator 322 then performs a round-to-zero ("RT0") operation on the initial lower result boundary RBL in response to a state of rounding mode control bit ("RMCB") 310. In at least one embodiment, RMCB 310 subsumes all rounding control information required to performed directed rounding. In particular, direct rounding emulator 300 receives rounding mode control bit 310 and then checks the state to determine whether it specifies implementing a round-to-zero operation. If the rounding mode control bit 310 enables such a rounding operation, then initial lower result boundary RBL (e.g., as a floating-point number) is rounded toward zero, thereby resulting in a truncated lower result boundary, or "TRBL." Generally, TRBL represents a floating point operation output or result. Next, direct rounding emulator 300 ascertains the sign (i.e., plus or minus) of initial lower result boundary RBL (or of the truncated lower result boundary, or "TRBL") by passing it to sign determinator 324. If the sign is a plus (or positive), then the initial lower result boundary RBL lies within a range of positive real numbers (e.g., from zero to +INF) in real number space, whereas if the sign is minus (or negative), then initial lower result boundary 302 lies within a range of negative real numbers (e.g., from zero to –INF). Depending on the sign, result boundary adjuster (lower) 326 then determines whether to establish the lower bound as either the truncated lower result boundary ("TRBL") (i.e., which is rounded toward zero) or as adjusted lower result boundary ARBL. Establishing the lower bound at TRBL emulates a round-to-negative infinity if the sign is positive, whereas establishing the lower bound at ARBL emulates a round-to-negative infinity if the sign is negative. Note that "initial" result boundaries are those boundaries that have yet to be either truncated or adjusted.

Upper rounder 331 is configured to determine an upper result boundary and operates in a manner similar to lower rounder 321. As shown, truncator 332 truncates an initial upper result boundary ("RBU") using a round-to-zero rounding operation, so long as rounding mode control bit 310 specifies implementing round-to-zero operation. Next, sign determinator 334 determines the sign of the initial upper result boundary RBU (or the truncated upper result boundary, "TRBU"). Generally, TRBU represents a floating point operation output or result. Depending on the sign, result boundary adjuster (upper) 336 then determines whether to establish the upper bound as either the truncated upper result boundary TRBU (i.e., which is rounded toward zero) or as adjusted upper result boundary ARBU. Establishing the upper bound at TRBU emulates a round-to-positive infinity operation if the sign is negative, whereas establishing the upper bound at ARBU emulates a round-to-positive infinity operation if the sign is positive. Note that the elements shown in FIG. 3 each can be implemented in hardware, such as integrated circuits, or in software, such as programs in assembly-level or machine-level code, or any combination thereof. Further, each element and/or its functionality can be combined in any manner. In a specific embodiment, assembly language instructions 350 can implement the functions of directed rounding emulator 300. For example, assembly instruction ("fop.trunc") 352 can be used to compute and truncate a result boundary, whereas assembly instruction ("fcomp") 354 and assembly instruction ("iadd") 356 respectively compares the sign to a specific state (to determine whether true or not) and increments a value to adjust a result boundary.

Figure 4A:
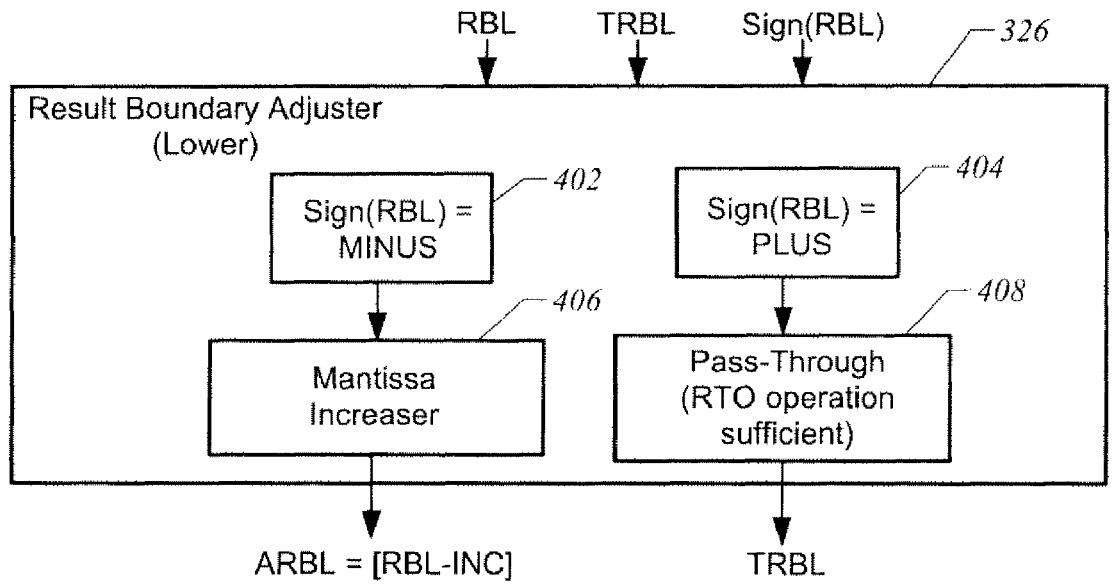
FIGS. 4A and 4B are block diagrams illustrating upper and lower result boundary adjusters, respectively, according to one embodiment of the invention.
Figure 4B:
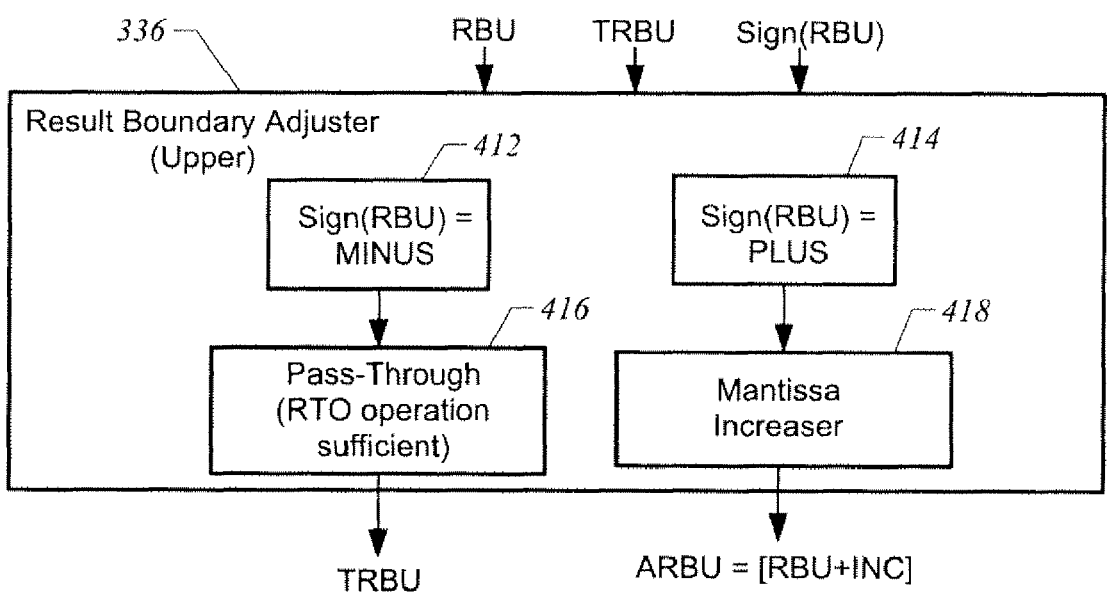

FIGS. 4A and 4B are block diagrams respectively illustrate upper and lower result boundary adjusters, according to one embodiment of the invention. FIG. 4A depicts an example of lower result boundary adjuster 326 (FIG. 3) of various embodiments. If the sign 404 of lower result boundary RBL (or truncated RBL, or TRBL) is positive (i.e., a plus sign), then truncation of initial lower result boundary RBL serves as a sufficient approximation to performing a round-to-negative infinity operation. With the RT0 operation being sufficient, pass-through 408 provides the truncated RBL as the lower boundary. But if the sign 402 of lower result boundary is negative (i.e., a minus sign), then lower result boundary adjuster 326 uses mantissa increaser 406 to adjust the lower result boundary by an amount towards –INF. In one embodiment, mantissa increaser 406 adds an amount to the mantissa of the floating-point representation of lower result boundary RBL (or to the truncated RBL), which increases the magnitude of the lower result boundary toward –INF. By adding the amount to the mantissa, initial lower result boundary RBL is bumped toward –INF. As such, this serves as a sufficient approximation to performing a round-to-negative infinity operation if lower result boundary RBL is negative. A floating-point number has the form: S_EEEE . . . EE_MMM . . . MM, where S is the sign bit, E represents bits constituting the exponent and M represents bits constituting the mantissa. When all M bits representing lower result boundary RBL are ones, then mantissa increaser 406 ensures that the least significant E bit is incremented to increment the exponent. While the amount added to the mantissa can be any number, in various embodiments the amount is an integer value of one. In a specific embodiment, initial lower result boundary RBL provides the context with which to emulate a round-to-negative infinity when rounding mode control bit 310 (FIG. 3) specifies implementing a round-to-zero operation.

FIG. 4B depicts an example of upper result boundary adjuster 336 (FIG. 3) of various embodiments. If the sign 412 of upper result boundary RBU (or truncated RBU or TRBU) is negative, then truncation of upper result boundary RBU serves as a sufficient approximation to performing a round-to-positive infinity operation. With the RT0 operation being sufficient, pass-through 416 provides the truncated RBU as the upper boundary. But if sign 414 of upper result boundary RBU is positive, then upper result boundary adjuster 336 uses mantissa increaser 418 to adjust the upper result boundary RBU (or the truncated RBU, or TRBU) by an amount towards +INF. The amount is added to the mantissa of the floating-point representation of upper result boundary RBU, thereby increasing the magnitude of upper result boundary RBU toward +INF. Note that in some cases that the determination of the sign and/or increasing the mantissa can be performed on either truncated or pre-truncated numeric representations of the result boundaries. The pass-throughs 408 and 416 can be hardware gates or can be an instruction condition, or both.

Figure 4C:
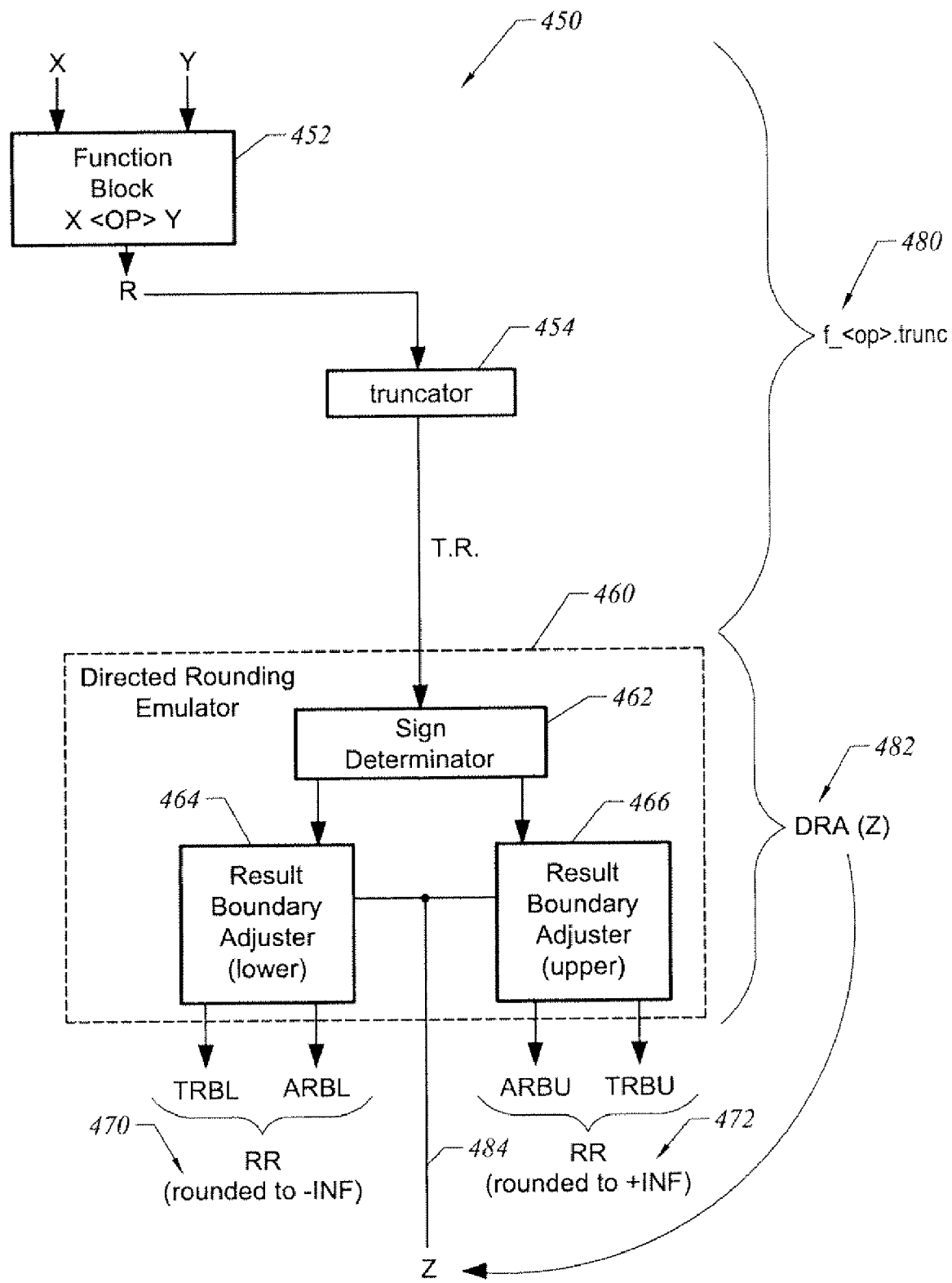
FIG. 4C is a functional block diagram depicting a directed rounding emulator configured to round a result to either –INF or +INF, according to an embodiment of the invention.

FIG. 4C is a functional block diagram depicting a directed rounding emulator configured to round a result to either −INF or +INF, according to an embodiment of the invention. Diagram 450 includes a function block 452 for producing a floating-point output, or result "R," by performing an operation on X and Y, both of which can be arguments specified by an instruction. Also included is a truncator 454 that operates to truncate R, where truncator 454 has a structure and/or functionality similar to truncators 322 and 332 (FIG. 3). Note that an instruction ("f_<op>.trunc") 480 can initiate the combined functionality of function block 452 and truncator 454. The output of truncator 454 is a truncated (intermediate) result, "TR." Sign determinator 462 of directed rounding emulator 460 receives truncated result, TR, and then provides both the sign and the truncated result to both result boundary adjuster (lower) 464 and result boundary adjuster (upper) 466, one or more of which have equivalent structures and/or functionalities as those similarly-named elements in FIG. 3. Result boundary adjuster (lower) 464 and result boundary adjuster (upper) 466 respectively determine a rounded result 470 to −INF and a rounded result 472 to +INF. Note that in one embodiment, only one of rounded results 470 and 472 is determined based on the state of an enable signal ("Z") 484. For instance, if Z indicates that a "round-to-positive infinity" is to be performed, then Z enables result boundary adjuster (upper) 466 to produce rounded result 472. Z can also enable result boundary adjuster (lower) 464 to produce rounded result 470. In one embodiment, a specialized instruction, which is referred to as a "direct-round adjust" ("DRA") instruction 482, takes Z 484 as an argument for selecting which direction to round the truncated result, TR. Directed rounding emulator 460 is suitable to practice directed rounding emulator 114 in FIG. 2A. Note that while some elements of FIG. 4C refer to "result boundaries" and the like, an ordinarily skilled artisan should appreciate that the elements of FIG. 4C can collaborate to implement interval arithmetic or any kind of directed rounding.

Figure 5:
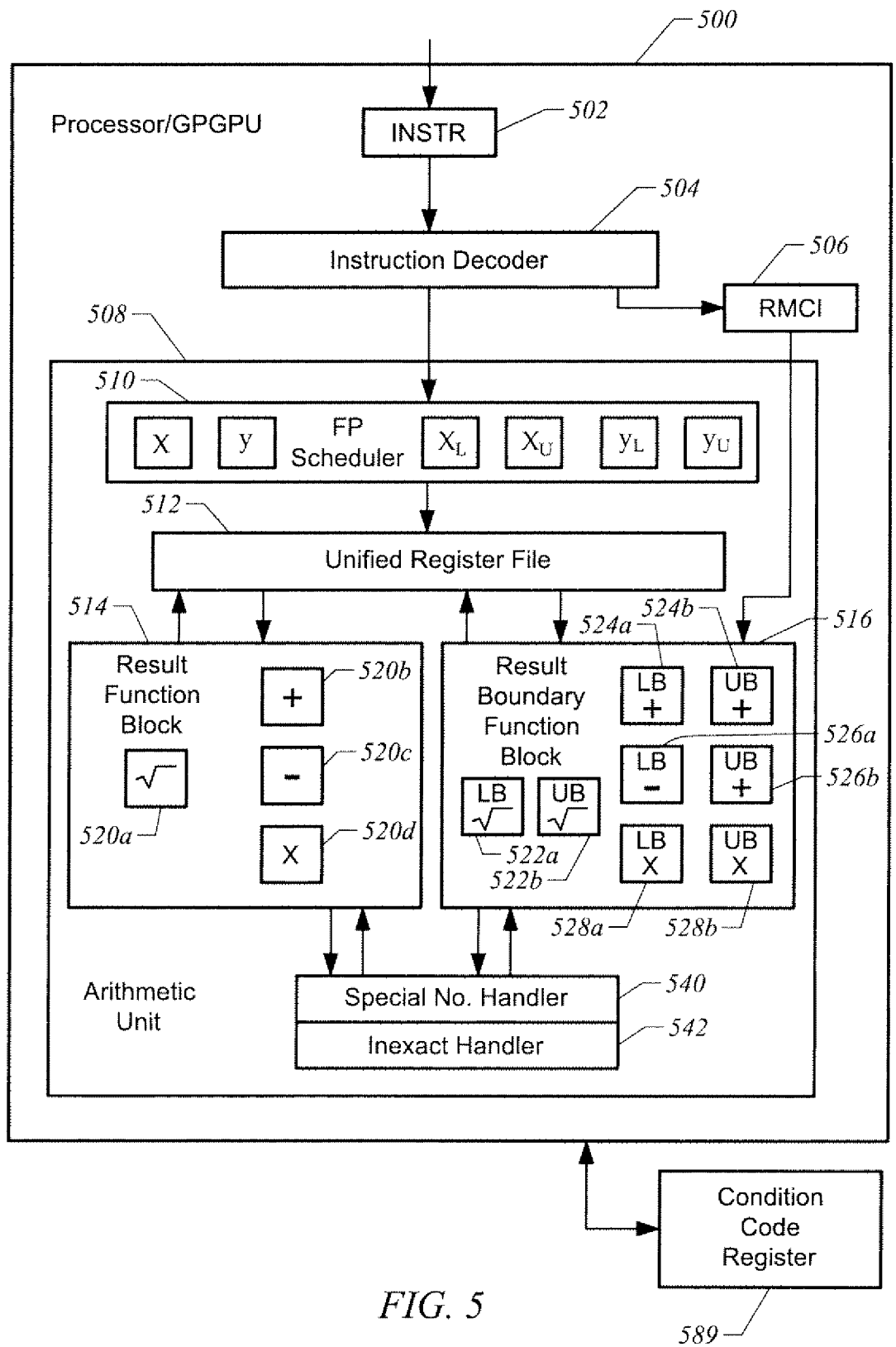
FIG. 5 presents a processor that includes result boundary function blocks that emulate rounding modes during an arithmetic operation, according to one embodiment of the invention.

FIG. 5 presents a processor that includes result boundary function blocks that emulate rounding modes during interval arithmetic, according to one embodiment of the invention. Examples of processor 500 include a central processing unit ("CPU"), a general-purpose graphics processing unit ("GPGPU"), and the like. As shown, processor 500 is configured to receive an instruction ("instr") 502 having encoded round control information contained therein to emulate direct rounding. Instruction decoder 504 is designed to decode instruction 502 to at least identify and extract a rounding mode control bit ("RMCB") 506 (or some other indicia discernible by arithmetic unit 508 that the rounding mode is to be round-to-zero). Rounding mode control bit 506, when specifying a round-to-zero mode, signals to result boundary function block 516 to implement directed rounding emulation.

Arithmetic unit 508 includes a floating-point ("FP") scheduler 510, a unified register file 512, a result function block 514, a result boundary function block 516, a special number ("no.") handler 540 and an inexact handler 542. Floating-point ("FP") scheduler 510 handles floating-point instructions, such as macro-operation ("macroOP") or micro-operation ("micro-op") instructions, which are directly understood by the execution units within result function block 514 and result boundary function block 516. Decoded instructions and operand data are then loaded into unified register file 512, which in some embodiments, includes registers used for both integer and floating-point calculations. Advantageously, unified register file 512 is implemented to calculate both lower result boundary values and upper result boundary values by incrementing a floating-point number. That is, unified register file 512 facilitates performing integer arithmetic (i.e., incrementing by one) on a floating-point number. This conserves computational resources that otherwise would be consumed by exchanging a lower result boundary value of an upper result boundary value between separate integer and floating-point register files.

Result function block 514 includes the following execution units: a square root unit 520a, an addition unit 520b, a subtraction unit 520c, a multiplication unit 520d and other well known execution units not shown. Execution units 520a to 520d perform a specific arithmetic operation to determine a result. Result boundary function block 516 contains execution units that are implemented as pairs of lower rounders and upper rounders, each of which has a structure and/or functionality as described in FIG. 3, but with lower and upper boundary operation units specified as performing a particular math operation. In particular, result boundary function block 514 includes the following execution units: a lower result boundary square root unit 522a for determining a lower result boundary for the result of a square root operation, an upper result boundary square root unit 522b for determining an upper result boundary for the result of a square root operation, a lower result boundary addition unit 524a, an upper result boundary addition unit 524b, a lower result boundary subtraction unit 526a, an upper result boundary subtraction unit 526b, a lower result boundary multiplication unit 528a, and an upper result boundary multiplication unit 528b, all of which are configured to emulate direct rounding according to various embodiments of the present invention.

Special number ("no.") handler 540 is configured to handle or screen out any lower result boundary value or any upper result boundary value that is not a number ("NaN") or is an infinite number ("INF"). Further, special number handler 540 can be configured to screen out the following: invalid operations, denormalized operands (i.e., denormals), divide by zero operations, numeric overflows, and numeric underflows. Inexact handler 542 is configured to handle inexact results (i.e., the result is rounded because it can not be exactly represented by the output format). When a result is inexact, an "inexact bit" is set by inexact floating-point operations and requires clearing by software. Note that if the inexact bit is set, performing an "exact" floating-point operation does not reset the inexact bit so that inexact results can be detected over a number of floating-point operations. In at least one embodiment, inexact handler 542 is configured to clear the inexact bit before performing any floating-point operations, and to clear it again if any of the execution units 522a to 528b decide to perform directed round adjust operations. Inexact handler 542 can manage the exact/inexact state of the floating-point operation and the sign of result boundary as a "condition code" generated by result function block 514. Since the mantissa adjustment performed by result boundary function block 516 is part of the overall rounding process, it in some cases should not be performed on results generated by result function block 514 that are exact. Otherwise, the system would not properly implement identities such as x+0=x, where x can exactly be represented as a floating-point number. As such, directed rounding emulators of various embodiments of the invention can be configured to examine a condition code, such as one or more bits in a condition code register 589, and increment the mantissa accordingly. For example, if the result was inexact and the sign of the result boundary agree with the sign of the infinity being rounded toward, then the mantissa would be incremented to emulate rounding to infinity.

Figure 6:
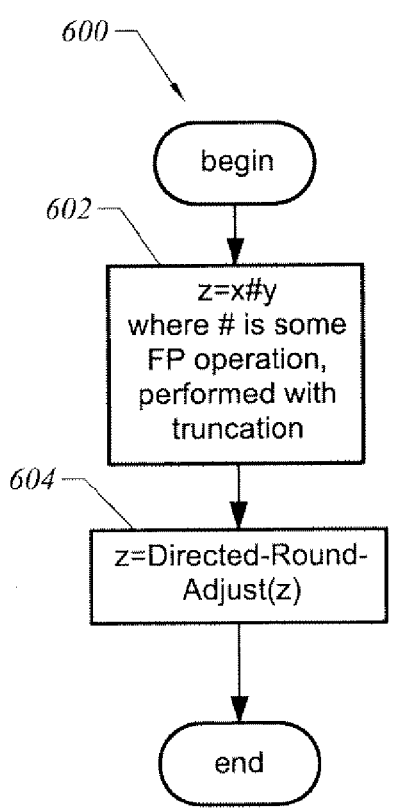
FIGS. 6 to 8 illustrate flows for methods of emulating directed rounding to negative infinity and positive infinity, according to various embodiments of the invention.
Figure 7:
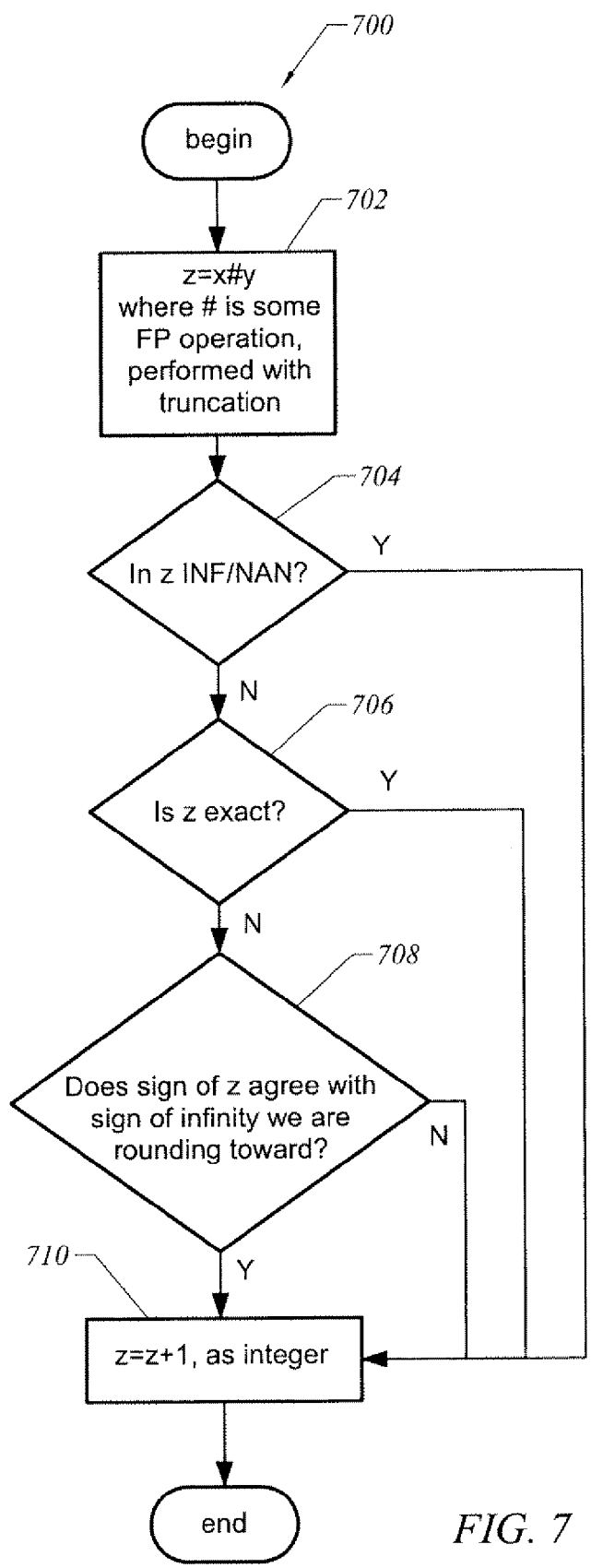
Figure 8:
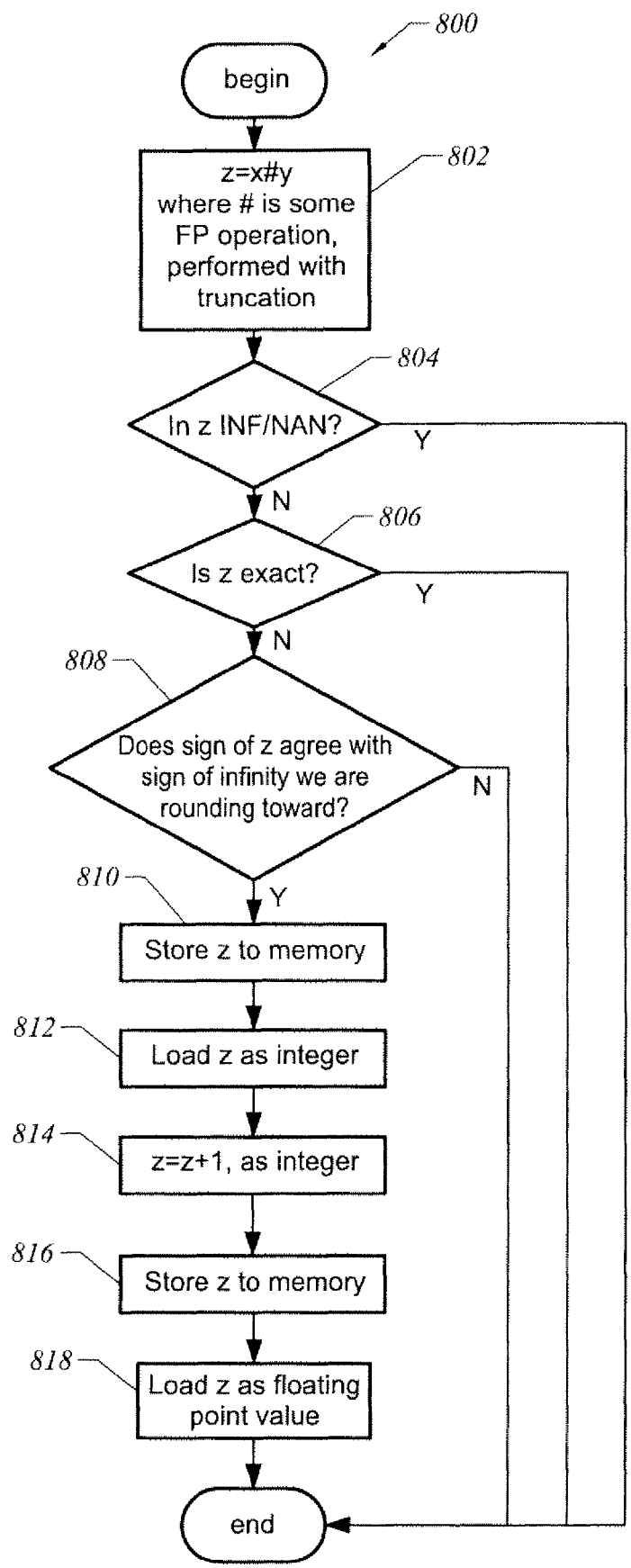

FIGS. 6 to 8 illustrate flows for methods of emulating directed rounding to negative infinity and positive infinity, according to various embodiments of the invention. FIG. 6 depicts a flow 600 for an emulating directed rounding using a specialized instruction, according to an embodiment of the invention. At 602, an arithmetic operation ("#") is performed on an operand X and an operand Y to yield a result boundary Z, whereby the result boundary Z is truncated. Note that operands X and Y can represent either lower boundaries or upper boundaries subject to interval arithmetic operations. Next at 604, a special instruction is executed to emulate directed rounding for a specific result boundary (i.e., either the lower or the upper). As shown, the specialized high-level (or assembly) instruction "Directed-Round-Adjust (Z)" takes result boundary Z as an operand and returns either a truncated result boundary or an adjusted result boundary, as described in various embodiments above. For example, instruction Directed-Round-Adjust (Z) can provide the combined functions of instruction fcomp 354 and iadd 356 (FIG. 3). In one embodiment, Directed-Round-Adjust (Z) implicitly resolves special numbers, such as INFs and NANs, thereby foregoing a requirement by a programmer to determine how to handle these special cases. In another embodiment, special instruction Directed-Round-Adjust (Z,cc) at 604 (not shown) takes a condition code, "cc," as an additional input where "cc" contains the exact/inexact result of the floating-point operation that generated Z as an output. In such an embodiment, no adjustment would be made to results that were exact according to the condition code.

FIG. 7 depicts a flow 700 for an emulating directed rounding in a processor having a unified floating-point and integer register file, according to an embodiment of the invention. An arithmetic operation ("#") is performed at 702 to determine a result boundary Z. At 704, flow 700 determines whether result boundary Z (and optionally whether a result boundary) is a special number (i.e., an INF or a NaN). At 706, flow 700 determines whether result boundary Z is exact. If result boundary Z is neither a special number or nor an inexact result, then flow 700 continues to 708. In one embodiment, if the sign of the result boundary Z agrees with sign of infinity to which a result boundary is being rounded, then flow 700 continues to 710. Then at 710, the value representing result boundary Z is adjusted by one (i.e., incremented by one), whereby result boundary Z becomes an integer. But if the sign of the result boundary Z does not agree with sign of infinity to which a result boundary is being rounded, then flow 700 diverts to the end because truncation of result boundary Z at 702 is sufficient to emulate rounding to infinity. Advantageously, the unified register file conserves computational resources by enabling adjustment of a floating-point number using an integer number one, thereby foregoing data exchanges between separate register files.

FIG. 8 depicts a flow 800 for an emulating directed rounding in a processor having separate floating-point and integer register files, according to an embodiment of the invention. Flow 800 performs similar functions as flow 700 from 802 to 808. But if the sign of the result boundary Z at 808 agrees with sign of infinity to which a result boundary is being rounded, then flow 800 includes addition functions. At 810, the value of result boundary Z is stored in memory prior to it being loaded as an integer at 812 into an integer register file. Then at 814, the value representing result boundary Z is incremented by one as an integer. At 816, result boundary Z is stored in memory and then is loaded as a floating-point number into a floating-point register file at 818.

Figure 9:
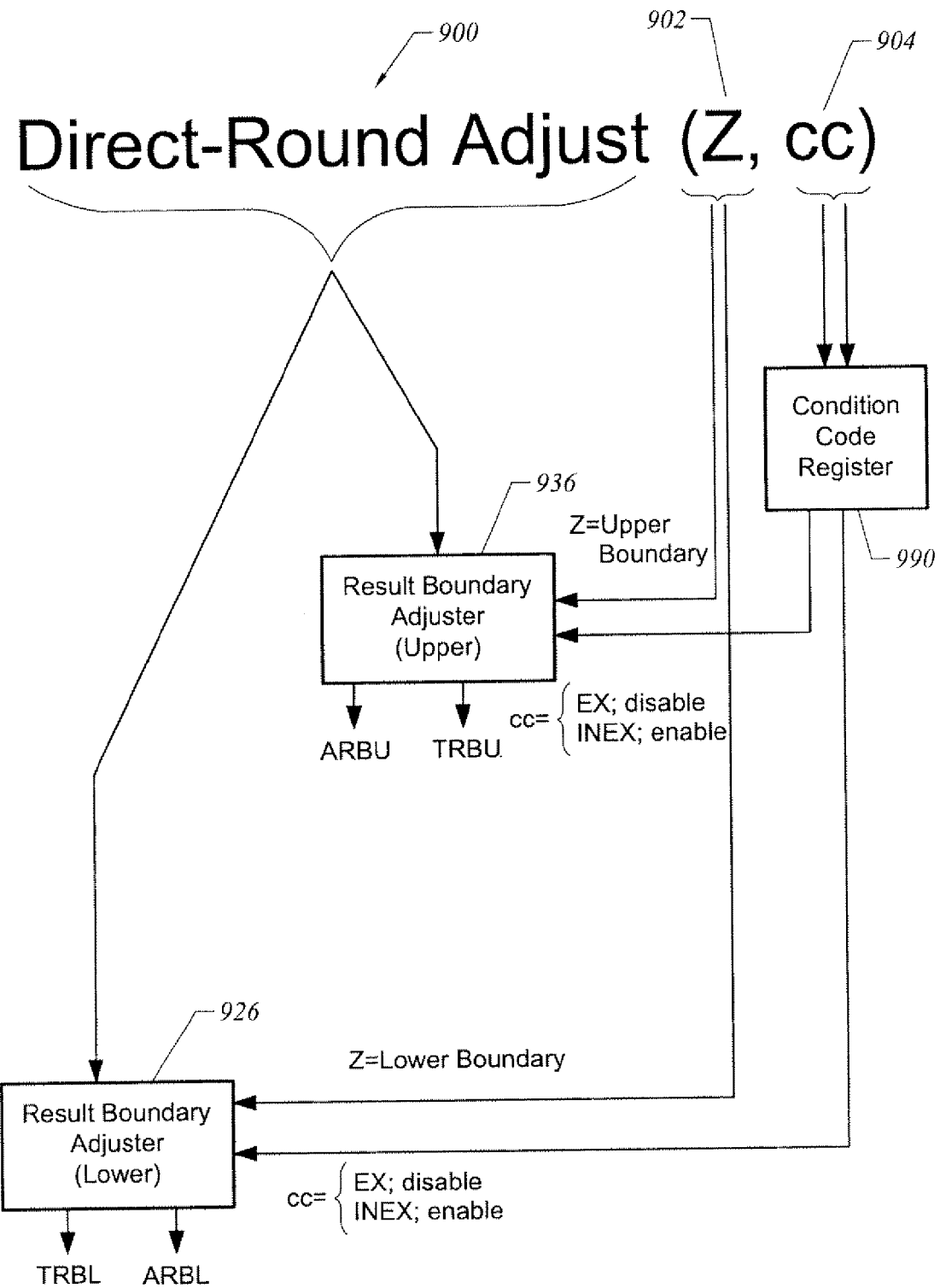
FIG. 9 depicts implementation of a specialized instruction to effectuate directed rounding emulation, according to an embodiment of the invention.

FIG. 9 depicts implementation of a specialized instruction to effectuate directed rounding emulation, according to an embodiment of the invention. Specialized instruction 900 is a single instruction configured to perform directed rounding to determine either a lower bound (or endpoint) or an upper bound (or endpoint), or both. For example, consider that specialized instruction 900 is named as a "direct-round adjust" instruction and takes two arguments: (1) Z 902 and (2) cc 904, where Z 902 represents either the lower or upper bound under consideration and cc 904 represents whether a result of a floating-point operation is either exact ("EX") or inexact ("INEX"). Note that cc 904 is optional in some cases. In at least one embodiment, specialized instruction 900 determines an upper result boundary 936 (either adjusted, or "ARBU," or truncated, or "TRBU") and lower result boundary 926 (either adjusted, or "ARBL," or truncated, or "TRBL") when Z represents the upper boundary and lower boundary, respectively. Note that when cc 904 is implemented, it selects whether to enable the adjustment of either the upper or lower result boundaries. In particular, if cc represents an exact, or EX, result, then generation of ARBU and ARBL is disabled (i.e., the result boundaries are not adjusted), whereas if cc represents an inexact, or INEX, result, then generation of ARBU and ARBL is enabled (i.e., the result boundaries are adjusted). In at least a specific embodiment, specialized instruction 900 determines upper result boundary 936 and lower result boundary 926 as determined by upper result boundary adjuster 336 and lower result boundary adjuster 326, respectively, of FIG. 3. Note that if a condition code 904 influences the execution of specialized instruction 900, condition code 904 (i.e., either EX or INEX) can be accessed in a condition code register 990. Note that the drawbacks of implementing a global register are absent by accessing condition code 904 in condition code register 990 since hardware generally sets condition code as a sticky bit rather than software.

Figure 10A:
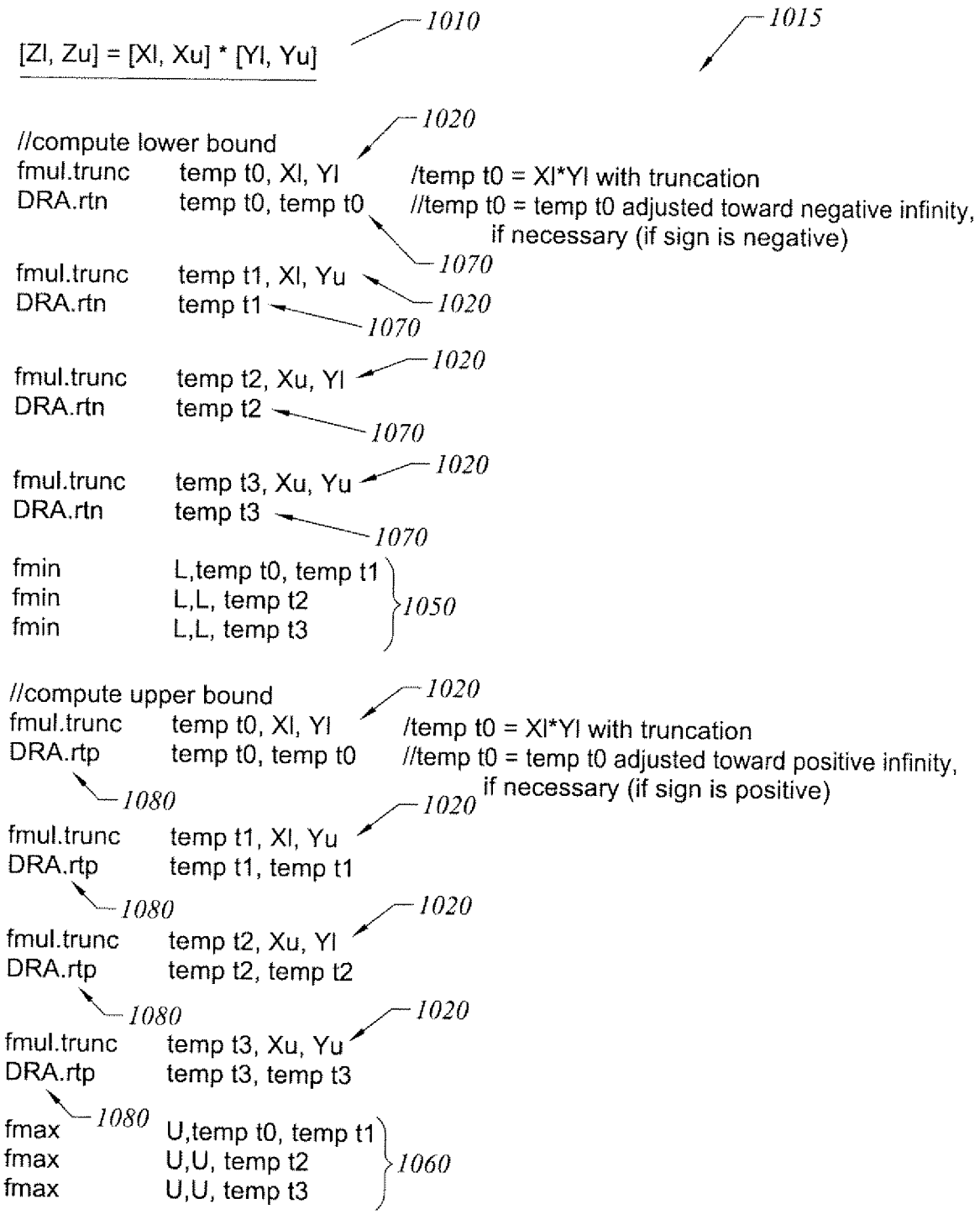

FIGS. 10A to 10C depict code snippets each representing an implementation of specialized instructions to provide for directed rounding emulation, according to at least some of the various embodiments of the invention. In FIG. 10A, code snippet 1015 illustrates a technique for implementing directed rounding as applied to interval multiplication of two intervals X=[Xl, Xu] and Y=[Yl, Yu] to form a product 1010 as interval [Zl, Zu]. In this example, instructions "fmul.trunc" 1020 are executed to multiply left and right endpoints, with the immediate results (i.e., immediate products) being truncated. Further, instructions "fmin" 1050 and "fmax" 1060 determine the minimum and maximum values, respectively, thereby producing the left endpoint (e.g., Zl) and the right endpoint (e.g., Zu) of the result. "Directed-round adjust" ("DRA.rtn") 1070 and ("DRA.rtp") 1080 instructions operate as described in FIG. 9 to determine a lower and upper result boundary, respectively. While the number of instructions in some cases can be larger than that of conventional approaches, none of instructions in code snippet 1015 update a global register, such as a "control word" (or "control status word"), which requires relatively many clock cycles. Advantageously, code snippet 1015 reduces delays in calculating results that are common with conventional techniques. In at least one embodiment, instructions "fmul.trunc" 1020 can be performed by either lower bound operation unit 320 or upper bound operation unit 332, or both. For example, fmul.trunc 1020 can be implemented as fop.trunc 350, which truncates a floating-point operation result. In a specific embodiment, instructions DRA 1070 and 1080 can be performed by result boundary adjuster 326 (FIG. 4) and result boundary adjuster 336 (FIG. 4), respectively. Note that instructions in code snippet 1015 need not rely on condition codes, and thus can perform rounding regardless of the exactness of results.

In FIG. 10B, code snippet 1025 illustrates another technique for implementing directed rounding as applied to interval multiplication to form a product 1012 as interval [Zl, Zu], according to an embodiment of the invention. Code snippet 1025 provides for a reduction in instruction count by taking advantage of common subexpressions that result from truncation. By both truncating results of floating-point operations and performing directed rounding adjustments before determining the minimums (i.e., using fmin 1050 instructions) and maximums (i.e., using fmax 1060 instructions), code snippet 1025 can advantageously reduce the number of relatively expensive multiplication operations, such as from eight to four (e.g., 4 instructions 1020), thereby conserving computational resources for performing other calculations. As shown, code snippet 1025 has 18 instructions rather than 22 as used in code snippet 1010 of FIG. 10A.

In FIG. 10C, code snippet 1035 illustrates yet another technique for implementing directed rounding as applied to interval multiplication to form a product 1014 as interval [Zl, Zu], according to an embodiment of the invention. Code snippet 1035 provides additional advantages over aforementioned techniques, including the propagation of exact/inexact indications to the DRA instructions, for example, when emulating directed rounding. Namely, "direct-round adjust" ("DRA.rtn") 1070 and ("DRA.rtp") 1080 instructions each access one of four condition code registers (i.e., CC0, CC1, CC2, CC3) to determine whether a result was either exact or inexact. During execution of code snippet 1035, instructions 1070 and 1080 perform an adjust operation if the result was inexact (i.e., they forego adjustments if the result was exact). In a specific embodiment, "direct-round adjust" ("DRA.rtn") 1070 and ("DRA.rtp") 1080 instructions can each access a single condition code register. In this case, code snippet 1035 would be composed of instructions sequenced very similar to those in FIG. 10A (e.g. the DRA instructions can be sequenced to follow the fmul.trunc 1020 to adjust the results of instructions 1020).

Condition code registers can provide advantages over using global registers (including control status words). Using control status words to determine exactness (i.e., whether a result is exact or inexact) is relatively inconvenient and slow for execution of a single instruction. This is because the exact/inexact state is written to a status word having "sticky bit" semantics. That is, the exact/inexact state is set by hardware and cleared by software. As such, architectures having control status words are designed to bracket large amounts of code so the software can decide whether to "try again" (i.e., re-execute the bracketed code) if a sticky bit representing exactness gets set during a computation. As such, these architectures are not well suited to operate at the individual instruction level because conventional architectures generally require software to: (1) bracket the single instruction with other instructions to clear the exact/inexact bit from the status word, and then (2) check the exact/inexact bit in the status word right after the instruction is executed. This process repeats for each single instruction, such as for each of the multiple fmul.trunc instructions. As a consequence, the conventional techniques cause the instruction count to increase dramatically as performance suffers substantially due to the repeated acts of checking and clearing bits in the status word. This results in relatively very slow performance. In addition, the conventional architectures that control rounding using status words generally have failed to optimize the execution speeds of code using such status words because instructions relying on exactness are generally not used often.

Figure 11:
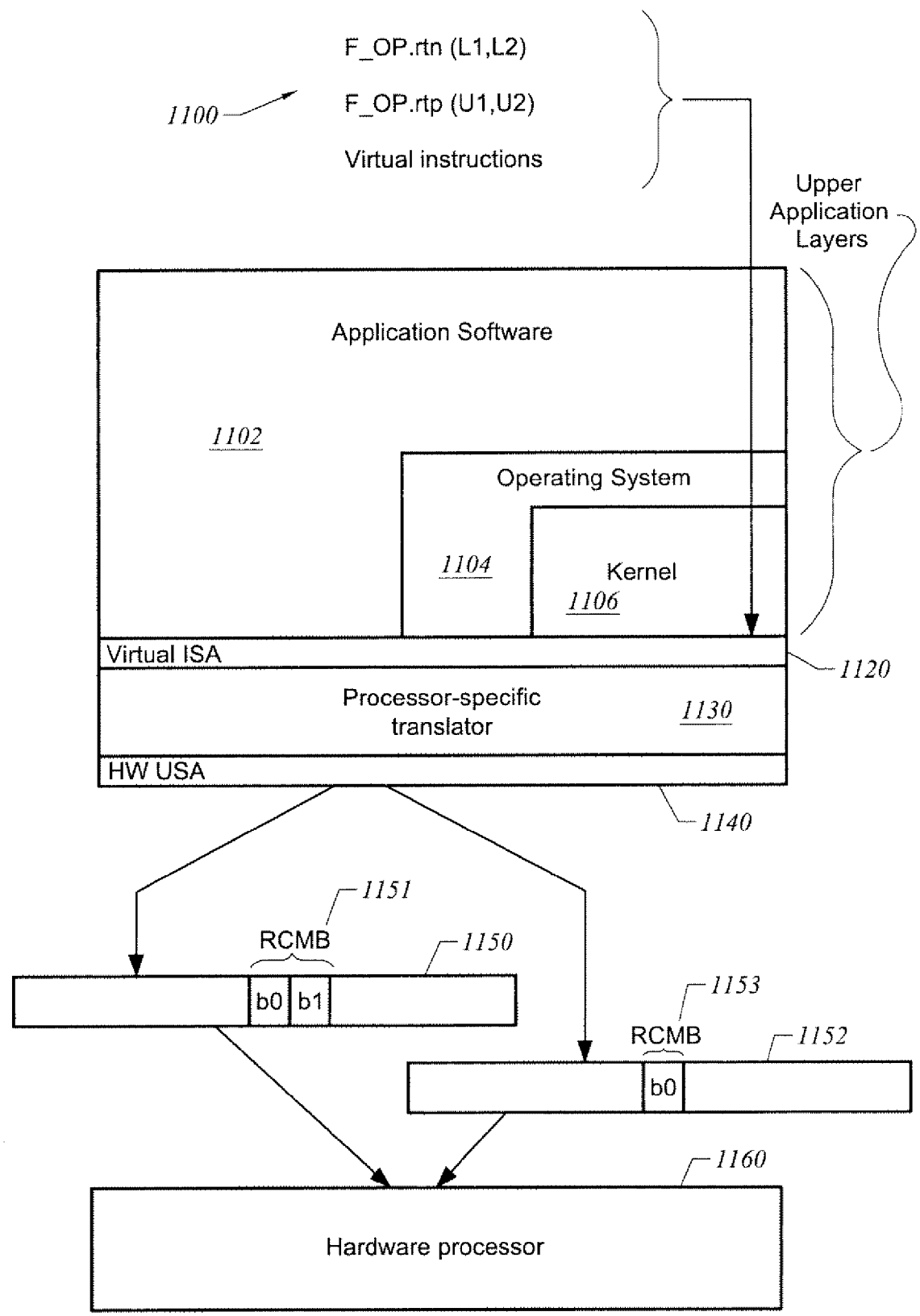
FIG. 11 illustrates a virtual instruction set architecture configured to translate virtual assembly instructions into machine-level instructions that can include either two or one rounding mode control bits, according to various embodiments of the invention.

FIG. 11 illustrates a virtual instruction set architecture configured to translate virtual assembly instructions into machine-level instructions that can include either two or one rounding mode control bits, according to various embodiments of the invention. As shown, virtual assembly instructions 1100 are implemented with an applications software program 1102, such as a graphics program, an operating system 1104 and a kernel 1106 to interface with a virtual instruction set architecture ("Virtual ISA") 1120. Virtual instruction set architecture are a well-known concept and need not be discussed in detail. Notably, virtual assembly instructions 1100 can encode two bits of round control information to explicitly call out directed rounding emulation as either a round-to-positive infinity or a round-to-negative infinity. But these two bits of round control information virtual assembly instructions 1100 need not translate in two bits of round control information in machine-level instructions, such as in instruction 1152. Regardless, processor-specific translator 1130 operates to translate virtual assembly instructions 1100 to equivalent instructions in a hardware instruction set architecture ("HW ISA") 1140. From this, hardware instruction set architecture 1140 provides either a machine-level instruction 1150 with two bits (e.g., bits b0 and b1) of rounding control mode bits ("RCMB") 1151 or machine-level instruction 1152 with a single bit (e.g., bit b0) as the rounding control mode bit ("RCMB") 1153. Advantageously, machine-level instruction 1150 includes per-instruction rounding control information that does not rely on a global register for implementation, as do conventional directed rounding modes. Also, machine-level instruction 1152 advantageously includes fewer rounding control bits than conventional directed rounding modes. Hardware processor 1160, such as a general purpose GPU, or GPGPU, is configured to execute machine-level instructions 1150 and 1152.

Figure 12:
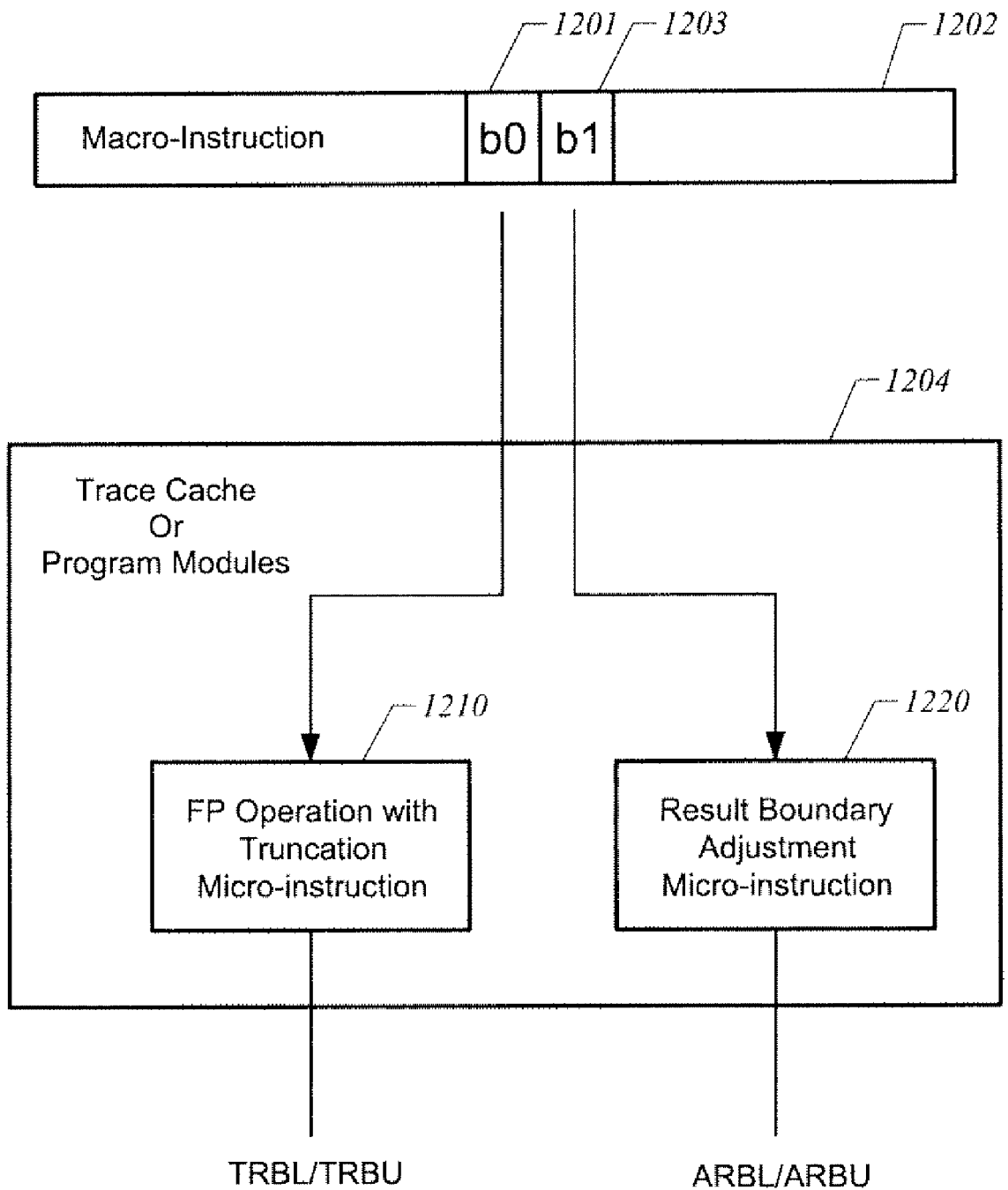
FIG. 12 illustrates directed rounding emulation implemented by decomposing a macro-instruction into multiple micro-instructions, according to various embodiments of the invention.

FIG. 12 illustrates directed rounding emulation implemented by decomposing a macro-instruction into multiple micro-instructions, according to various embodiments of the invention. As shown, a macro-instruction 1202 can include one or more rounding control bits, such as bits b0 and b1. Macro-instruction 1202 can be a machine-level or a virtual macro-instruction. Macro-instruction 1202 is then decomposed into micro-instructions 1210 and 1220, such that if macro-instruction 1202 is a machine-level instruction, then a trace cache 1204 (or equivalent) generates micro-instructions 1210 and 1220 as machine-level micro-Ops instructions. But if macro-instruction 1202 is a virtual instruction, then micro-instructions 1210 and 1220 can be implemented as modules of executable instructions. For example, micro-instruction 1210 can include executable instructions for performing a floating-point operation with truncation, such as a performed by either lower bound operation unit 320 (FIG. 3) or upper bound operation unit 332 (FIG. 3), or both. Micro-instruction 1220 can include executable instructions for performing adjustments to a result boundary. In one embodiment, bit ("b0") 1201 and bit ("b1") 1203 control execution of micro-instructions 1210 and 1220, respectively.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. For example, although the above descriptions of the various embodiments relate to directed rounding with respect to interval arithmetic, the discussion is applicable to emulating directed rounding in other calculations. Also, at least one embodiment of the present invention is a compiler configured to execute program instructions on a computer system to generate and compile machine-level instructions that are encoded with rounding control information in accordance to the present invention. In some embodiments, more than a single rounding control bit can be used. In other embodiments, one or more rounding control bits can be stored in a register.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. An arithmetic unit configurable to perform directed rounding emulation for rounding a result of an arithmetic computation, said arithmetic unit comprising:
   an instruction decoder configured to decode an instruction to extract rounding control information, wherein said rounding control information is a single rounding control bit, wherein said single rounding control bit consists of: (a) a first state specifying a first rounding mode for said result; and (b) a second state specifying a second rounding mode for said result and invoking emulated rounding for said result; and
   a directed rounding emulator configured to: (1) determine an emulated rounding mode based on a context of said arithmetic computation when said single rounding control bit is in said second state; and (2) adjust said result toward an adjusted result in accordance with said emulated rounding mode;
   wherein said emulated rounding mode is one of a third rounding mode and a fourth rounding mode;
   wherein said first rounding mode, said second rounding mode, said third rounding mode, and said fourth rounding mode are different from one another; and
   wherein said third rounding mode is a round-to-negative infinity rounding mode and said fourth rounding mode is a round-to-positive infinity rounding mode, said adjusted result is one of a first value and a second value, and said first value represents negative infinity ("−INF") and said second value represents positive infinity ("+INF").

2. The arithmetic unit of claim 1 wherein said first rounding mode is a round-to-nearest rounding mode and said second rounding mode is a round-to-zero rounding mode.

3. The arithmetic unit of claim 2 whereby said directed rounding emulator is configured to use no more than one rounding control bit to comply with at least the Institute of Electrical and Electronics Engineers Standard for Binary Floating-Point Arithmetic ("IEEE Std 754-1985").

4. The arithmetic unit of claim 1 further comprising an instruction bus configured to associate only said single rounding control bit per instruction, thereby reducing the width of either said instruction or said instruction bus, or both, to conserve resources that otherwise would be consumed to carry two or more rounding control bits per instruction.

5. The arithmetic unit of claim 1 further comprising:
   an operation unit configured to calculate said result using an arithmetic operation; and a truncator configured to truncate a value representing said result to form a truncated result.

6. The arithmetic unit of claim 5 wherein said operation unit and said truncator form said truncated result in response to the execution of a single instruction, said truncator being responsive to said single rounding control bit specifying round-to-zero.

7. The arithmetic unit of claim 6 further comprising:
   a sign determinator unit configured to determine a sign value that represents the sign of said truncated result to form a truncated result sign; and
   a result boundary adjuster configured to adjust said truncated result toward said first value if said truncated result sign matches the sign of said first value or toward said second value if said truncated result sign matches the sign of said second value,
   wherein said truncator adjusts said result toward said first value if said truncated result sign does not match the sign of said first value or toward said second value if said truncated result sign does not match the sign of said second value.

8. The arithmetic unit of claim 1 further comprising one or more operation units to perform interval arithmetic to form said result and another result, said directed rounding emulator being configured to determine endpoints for an interval specifying a set of all real numbers that includes a primary result.

9. The arithmetic unit of claim 8 wherein said context includes a first context and a second context, and each of said endpoints is an upper bound or a lower bound, and said lower bound provides said first context and said upper bound provides said second context.

10. The arithmetic unit of claim 8 wherein said endpoints further comprise a first endpoint as a lower result boundary ("RBL") and a second endpoint as an upper result boundary ("RBU").

11. The arithmetic unit of claim 1 further comprising a translator configured to translate an instruction including multiple rounding control bits into a corresponding instruction with said single rounding control bit.

* * * * *